(12) United States Patent
Shinohara et al.

(10) Patent No.: US 9,202,440 B2
(45) Date of Patent: Dec. 1, 2015

(54) INFORMATION PROCESSING APPARATUS, INFORMATION PROCESSING METHOD, AND DATA STRUCTURE OF CONTENT FILE

(75) Inventors: Takayuki Shinohara, Tokyo (JP); Hidehiko Morisada, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 14/344,116

(22) PCT Filed: Aug. 28, 2012

(86) PCT No.: PCT/JP2012/005392
§ 371 (c)(1),
(2), (4) Date: Mar. 11, 2014

(87) PCT Pub. No.: WO2013/042315
PCT Pub. Date: Mar. 28, 2013

(65) Prior Publication Data
US 2014/0340391 A1 Nov. 20, 2014

(30) Foreign Application Priority Data
Sep. 22, 2011 (JP) .................................. 2011-208172

(51) Int. Cl.
*G06T 17/00* (2006.01)
*G09G 5/14* (2006.01)
(Continued)

(52) U.S. Cl.
CPC ................ *G09G 5/14* (2013.01); *G06F 3/0482* (2013.01); *G06F 3/0483* (2013.01); *G06T 15/005* (2013.01); *G06T 17/005* (2013.01); *G06T 2210/36* (2013.01); *G09G 2354/00* (2013.01); *G09G 2380/14* (2013.01); *H04N 19/33* (2014.11); *H04N 19/44* (2014.11)

(58) Field of Classification Search
CPC ....... G06T 15/00; G06T 17/00; G06T 17/005; G06T 2210/36; G06T 15/005; G06F 3/0483; G06F 3/0482; G09G 5/14; G09G 2354/00; G09G 2380/14; H04N 19/44; H04N 19/33; H04N 9/44
USPC .......................................................... 345/419
See application file for complete search history.

(56) References Cited

U.S. PATENT DOCUMENTS 6,563,999 B1 5/2003 Suzuoki
2011/0273470 A1 11/2011 Ohba

FOREIGN PATENT DOCUMENTS

EP 2360562 A1 8/2011
JP 09282218 A 10/1997
(Continued)

OTHER PUBLICATIONS

JP 2007-213209 (machine translation on Apr. 13, 2015).*
(Continued)

*Primary Examiner* — Kee M Tung
*Assistant Examiner* — Michael Le
(74) *Attorney, Agent, or Firm* — Matthew B. Dernier, Esq.

(57) ABSTRACT

Information is configured in a tree structure comprising a root node, internal nodes, and leaf nodes, and an image is prepared for each node. Links to images of internal nodes are set in a root node image. When a display area satisfies a predetermined link condition the display target is switched from the root node image to an image of an internal node. A link to a leaf node image is set in each of the internal node images. Further, an order is defined for the leaf node images so that the images can be successively accessed. When the display is switched from a link area of an internal node image to a leaf node image and the display is to return to the internal node after images of leaf nodes are accessed, the image area of the internal node is displayed according to the number of images traversed.

11 Claims, 14 Drawing Sheets

(51) Int. Cl.
*G06T 15/00* (2011.01)
*G06F 3/0482* (2013.01)
*G06F 3/0483* (2013.01)
*H04N 19/44* (2014.01)
*H04N 19/33* (2014.01)

(56) References Cited

FOREIGN PATENT DOCUMENTS

| | | | |
|---|---|---|---|
| JP | 2007213209 A | 8/2007 | |
| JP | 2010117827 A | 5/2010 | |
| JP | 2010117828 A | 5/2010 | |

OTHER PUBLICATIONS

International Search Report for corresponding PCT Application No. PCT/JP2012/005392, Nov. 20, 2012.
Office Action for corresponding JP Application No. 2011-208172, dated Nov. 25, 2014.
Supplemental European Search Report for EP Application No. 12832816, dated Dec. 23, 2014.
International Preliminary Report on Patentability and Written Opinion for corresponding PCT Application No. PCT/JP2012/005392, Apr. 3, 2014.

* cited by examiner

F I G . 1
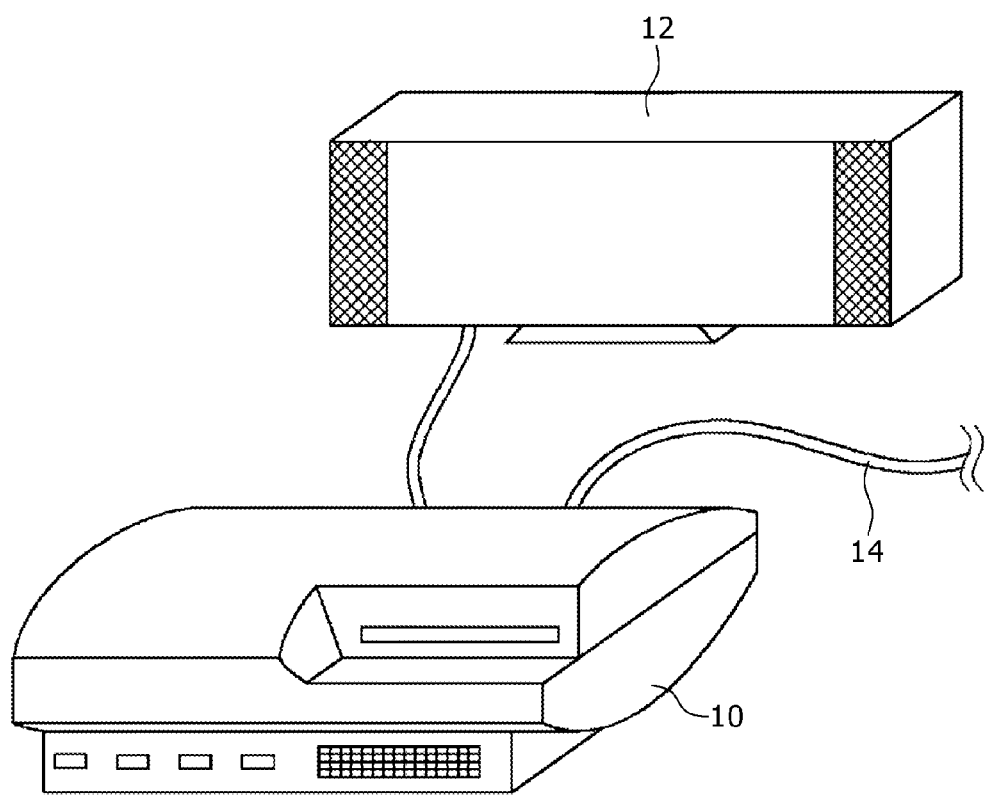

F I G . 2
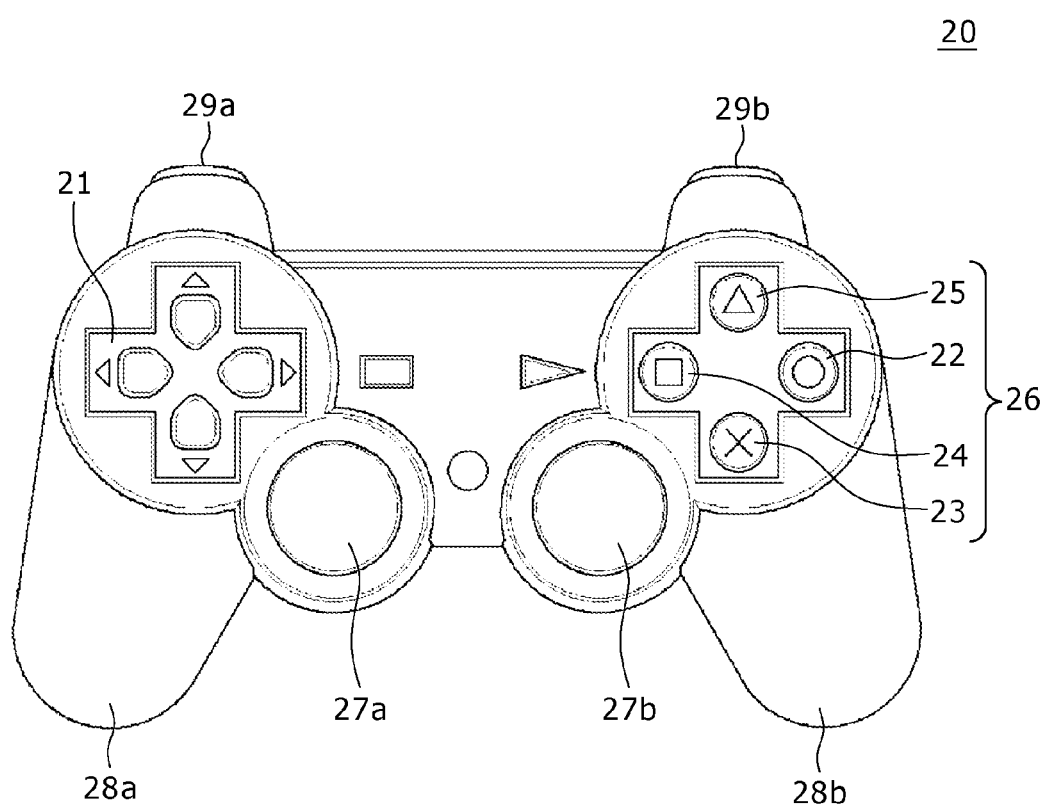

| 302 | 304 | 306 | 308 |
|---|---|---|---|
| 0.0, 0.0, 2.0 | 1.0, | parent_0, | -0.1, 0.2, 0.08 |
| 0.16, -0.11, 0.01 | -1.0, | child_0, | 0.0, 0.0, 1.0 |
| 0.10, -0.14, 0.01 | -1.0, | child_1, | 0.0, 0.0, 1.0 |
| 0.07, -0.15, 0.01 | -1.0, | child_2, | 0.0, 0.0, 1.0 |
| ... | | | |

300

160

| IMAGE DATA | LINK SOURCE IMAGE/LINK AREA | TYPE | FLAG |
|---|---|---|---|
| L1image | I1/region1 | CHAPTER | 1 |
| | I4/region1' | THUMBNAIL | 0 |
| L2image | I1/region2 | CHAPTER | 1 |
| | I4/region2' | THUMBNAIL | 0 |
| | R1/region2'' | COVER | 0 |
| L3image | I2/region3 | CHAPTER | 1 |
| | I4/region3' | THUMBNAIL | 0 |
| ... | ... | ... | ... |

170a 170b 170c 170d

170

INFORMATION PROCESSING APPARATUS, INFORMATION PROCESSING METHOD, AND DATA STRUCTURE OF CONTENT FILE

TECHNICAL FIELD

The present invention relates to an image processing technology wherein a movement of a viewpoint with respect to a display image is accepted.

BACKGROUND ART

An entertainment system for home use which not only can execute a game program but also can play a video has been proposed. In this entertainment system for home use, a GPU produces a three-dimensional image which uses polygons (refer to, for example, Patent Literature 1).

Not only a three-dimensional image of a game or the like but also character information and image information of various kinds of contents such as images of homepages, books, magazines, newspapers and advertisements have become very readily available with the spread of the network. Also it has become possible to browse character information or image information in high picture quality irrespective of the scale of an apparatus such as a personal computer or a mobile terminal. Thus, the image processing technology has become essentially required in everyday life.

CITATION LIST

Patent Literature

[PTL 1]
U.S. Pat. No. 6,563,999

SUMMARY

Technical Problem

As the image processing technology becomes familiar, it has become a tendency that the structure of an image displayed as a content and hence of information indicated by the image is complicated and the data size becomes huge. In such a situation as just described, it is considered that a content has information desired by a user but difficult to be accessed. Therefore, it is demanded to implement a content having desired information which can be accessed efficiently without depending upon the substance of the content.

The present invention has been made in view of such a problem as described above, and it is an object of the present invention to provide a technology used to display a content having desired information which can be accessed efficiently.

Solution to Problem

A mode of the present invention relates to an information processing apparatus. The information processing apparatus changes a display area in response to a viewpoint moving operation of a user to display an image. The information processing apparatus includes: a content storage unit in which data of a plurality of images of a display target and link setting files are stored in a mapped relationship to each other, a link setting file being set for each image in order to implement a link function for switching a display from an image being displayed to a different image when, during display of one image, an inclusion relationship between a display area and a particular link area satisfies a predetermined link condition, the link setting file describing information of the link area and identification information of an image of a link destination; an image switching controlling section configured to refer to the link setting files to determine whether or not, in response to the viewpoint moving operation for the image being displayed, the inclusion relationship between the link area set for the image and the display area satisfies the link condition and specify, when the link condition is satisfied, the identification information of the image of the link destination; and a display image processing section configured to carry out, based on the identification information received from the image switching controlling section, a rendering process for the image data to switch the display image. The plural images whose data are stored in the content storage unit include a plurality of images which configure an image sequence having an order defined in advance. The image switching controlling section specifies, when the image being displayed is an image which configures the image sequence, in response to a successive feeding operation of the display image carried out by the user, identification information of an image which is defined as a next image to the image being displayed in the order as a switching destination.

Another mode of the present invention relates to an information processing method. In the present information processing method, an information processing apparatus changes a display area in response to a viewpoint moving operation of a user to display an image. The method includes the steps of: reading out, from a storage apparatus, a content file in which data of a plurality of images of a display target and link setting files are mapped to each other, a link setting file being set for each image in order to implement a link function for switching a display from an image being displayed to a different image when, during display of one image, an inclusion relationship between a display area and a particular link area satisfies a predetermined link condition, the link setting file describing information of the link area and identification information of an image of a link destination; referring to the link setting files to determine whether or not, in response to the viewpoint moving operation for the image being displayed, the inclusion relationship between the link area set for the image and the display area satisfies the link condition and specifying, when the link condition is satisfied, the identification information of the image of the link destination; and carrying out, based on the identification information, a rendering process for the image data to switch a display image in a display apparatus. The plural images whose data are stored in the storage apparatus include a plurality of images which configure an image sequence having an order defined in advance. The step of specifying the identification information specifies, when the image being displayed is an image which configures the image sequence, in response to a successive feeding operation of the display image carried out by the user, identification information of an image which is defined as a next image to the image being displayed in the order as a switching destination.

A further mode of the present invention relates to a data structure of a content file. The data structure of a content file is a data structure of a content file which is processed in an information processing apparatus moving a display area in response to a viewpoint moving operation of a user to display an image. In the data structure, data of a plurality of images of a display target and link setting data are mapped to each other. The link setting data are set for each image in order to implement a link function for switching a display from an image being displayed to a different image when, during display of one image, an inclusion relationship between a display area and a particular link area satisfies a predetermined link condition. The link setting data describe information of the link area and identification information of an image of a link destination. The link setting data are referred to in order to determine whether or not, in response to the viewpoint moving operation for the image being displayed, the inclusion relationship between the link area set for the image and the display area satisfies the link condition and switch the display image to the image of the link destination. The plural images include a plurality of images which configure an image sequence having an order defined for switching the display in response to a successive feeding operation of the display image carried out by the user.

It is to be noted that also an arbitrary combination of the components described above and the representations of the present invention converted among a method, an apparatus, a system, a computer program, a recording medium on or in which the computer program is recorded and so forth are effective as modes of the present invention.

Advantageous Effects of Invention

According to the present invention, it is possible to make it efficient to access desired information of a content which involves information display.

BRIEF DESCRIPTION OF DRAWINGS

FIG. 1 is a view illustrating an environment in which an information processing system to which an embodiment can be applied is used.

FIG. 2 is a view showing an appearance configuration of an inputting apparatus which can be used in the information processing system of FIG. 1.

DESCRIPTION OF EMBODIMENTS

Figure 3:
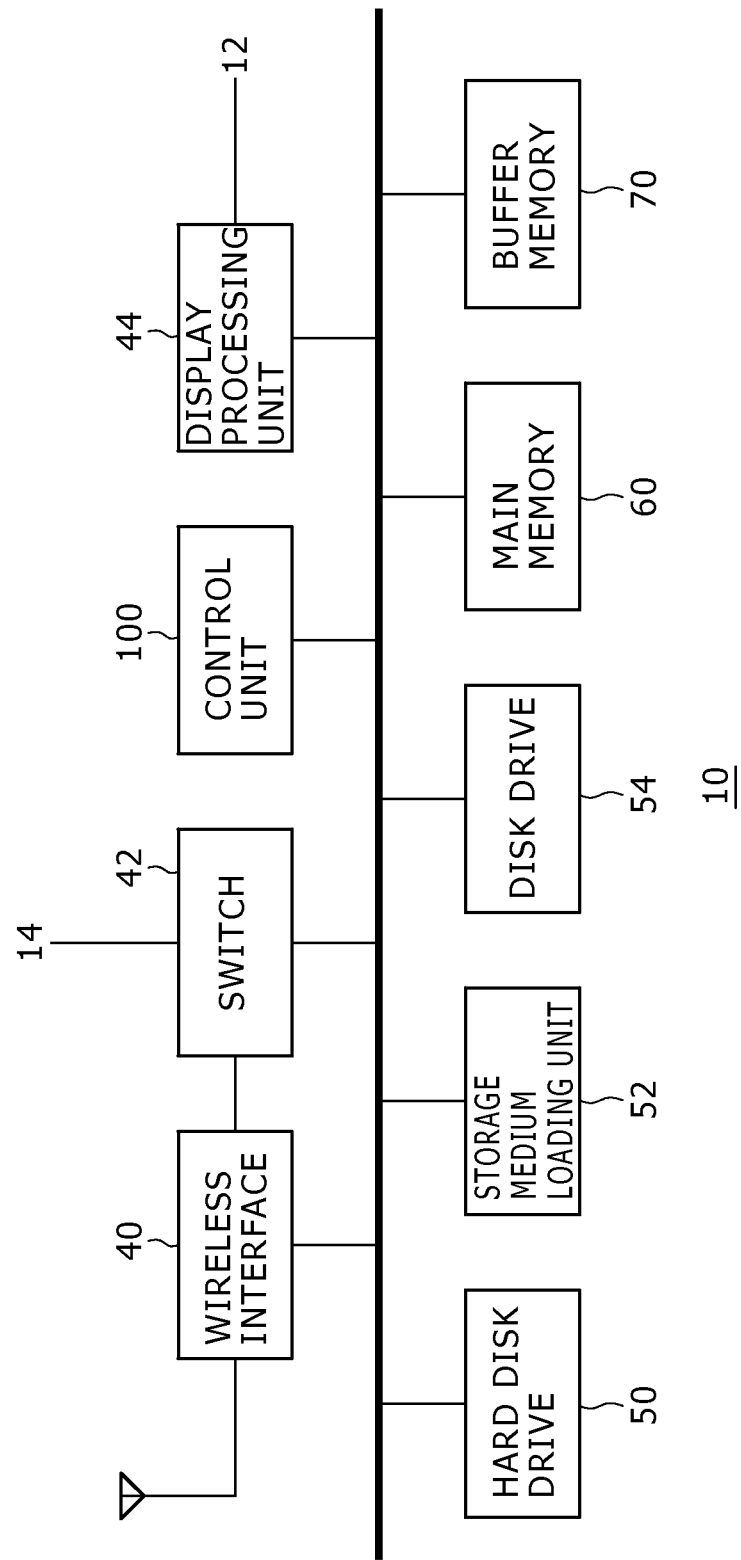
FIG. 3 is a view showing a configuration of an information processing apparatus in the present embodiment.

In the present embodiment, a content which involves display of visual information of a book, a newspaper, a magazine, a game image, a menu display image, a homepage image, a map, a photograph, a painting, an advertisement or the like is determined as a processing object. A display purpose of the content and a function which is achieved in the following description are not restricted. FIG. 1 illustrates an environment in which an information processing system to which the present embodiment can be applied is used. An information processing system 1 includes an information processing apparatus 10 which executes software for information processing, and a display apparatus 12 which outputs a result of processing by the information processing apparatus 10. The display apparatus 12 may be a television set which has a display unit for outputting an image and a speaker for outputting sound.

The display apparatus 12 may be connected to the information processing apparatus 10 through a wired cable or connected wirelessly through a wireless LAN (Local Area Network) or the like. The information processing apparatus 10 in the information processing system 1 may be connected to an external network such as the Internet through a cable 14 so as to download and acquire a content file. It is to be noted that the information processing apparatus 10 may be connected to an external network by wireless communication.

The information processing apparatus 10 may be, for example, a game apparatus or a personal computer and may implement an information processing function by loading a required application program. The information processing apparatus 10 carries out enlarging/reducing processes of an image displayed on a display unit of the display apparatus 12, a scrolling process of the image in an upward, downward, leftward or rightward direction or other processes, in accordance with a viewpoint moving request from a user. Such a changing operation of a display area including enlargement/reduction as just described is hereinafter referred to as "viewpoint moving operation." If the user operates an inputting apparatus while viewing an image displayed on the display unit, then the inputting apparatus transmits the inputted information to the information processing apparatus 10.

FIG. 2 shows an example of an appearance configuration of an inputting apparatus 20. The inputting apparatus 20 includes directional keys 21, analog sticks 27a and 27b, four different operation buttons 26, an L button 29a, and an R button 29b as operation means which can be operated by the user. The four operation buttons 26 include a circle button 22, a cross button 23, a square button 24, and a triangle button 25.

Various functions are allocated to the operation means in accordance with the processing contents carried out by the information processing apparatus 10. The user would operate, in a state in which the user grasps left and right handles 28a and 28b with the left and right hands, respectively, the operation means described above to input a starting or ending request of information processing or a requesting signal for a content being processed.

To some of the operation means, a function of inputting a request for enlarging/reducing a display image and a function of inputting a request for scrolling in the upward, downward, leftward or rightward direction are allocated. For example, the function of inputting a request for enlarging/reducing a display image is allocated to the analog stick 27b on the right side. The user can input a request for reducing a display image by pulling the analog stick 27b toward the user and can input a request for enlarging the display image by pushing the analog stick 27b away from the user.

The inputting function of a scrolling request is allocated to the directional keys 21. By depressing any of the directional keys 21, the user can input a scrolling request in the direction in which the directional key 21 is depressed. It is to be noted that the inputting function of a request for moving a display area may be allocated to different operation means. For example, the inputting function of a scrolling request may be allocated to the analog stick 27a. Further, as hereinafter described, functions of advancing and returning an image of a display target from among a plurality of images whose order is defined are allocated to the L button 29a and the R button 29b, respectively. Such an operation as just described is hereinafter referred to as "successive feeding operation." In FIG. 2, the L button 29a and the R button 29b are provided on an upper side face of the inputting apparatus 20 and are configured for depression toward the user by the index fingers or the like.

It is to be noted that the inputting apparatus 20 shown in FIG. 2 is a mere example and is not restricted in terms of the shape or the function. For example, such popular inputting apparatus as a mouse, a keyboard and a touch panel or combinations of them may be applied. Further, a camera for picking up an image of the user or the like, a microphone for fetching sound and so forth may be applied as the inputting apparatus.

The inputting apparatus 20 has a function of transmitting a signal in accordance with the substance of an operation by the user to the information processing apparatus 10 and is configured, in the present embodiment, for wireless communication with the information processing apparatus 10. The inputting apparatus 20 and the information processing apparatus 10 may establish a wireless connection using the Bluetooth (registered trademark) protocol or the IEEE 802.11 protocol. It is to be noted that the inputting apparatus 20 may be connected to the information processing apparatus 10 through a cable and transmit an input signal to the information processing apparatus 10.

FIG. 3 shows a configuration of the information processing apparatus 10. The information processing apparatus 10 includes a wireless interface 40, a switch 42, a display processing unit 44, a hard disk drive 50, a recording medium loading unit 52, a disk drive 54, a main memory 60, a buffer memory 70, and a control unit 100. The display processing unit 44 includes a frame memory for buffering data to be displayed on the display unit of the display apparatus 12.

The switch 42 is an Ethernet switch (Ethernet is a registered trademark) and is a device connected to an external apparatus by wire or wireless connection so as to transmit and receive data. The switch 42 is connected to an external network through the cable 14 so as to receive a content file or the like from a content server. The switch 42 is connected to the wireless interface 40. The wireless interface 40 is connected to the inputting apparatus 20 using a predefined wireless communication protocol. A signal inputted by the user in the inputting apparatus 20 is supplied to the control unit 100 through the wireless interface 40 and the switch 42.

The hard disk drive 50 functions as a storage apparatus for storing data. A content file may be stored in the hard disk drive 50. If a removable recording medium such as a memory card is loaded, then the recording medium loading unit 52 reads data from the removable recording medium. If a read-only ROM disk is loaded, then the disk drive 54 drives and recognizes the ROM disk and reads data. The ROM disk may be an optical disk, a magneto-optical disk or the like. The content file may be stored in such recording media.

The control unit 100 includes a multicore CPU. One general-purpose processor core and a plurality of simple processor cores are provided in the single CPU. The general-purpose processor core is called PPU (Power Processing Unit), and the remaining processor cores are called each SPU (Synergistic-Processing Unit). The control unit 100 may further include a GPU (Graphics Processing Unit).

The control unit 100 includes a memory controller connected to the main memory 60 and the buffer memory 70. The PPU includes a register and further includes a main processor as an entity of calculation execution. The PPU efficiently allocates tasks as basic units of processing in applications to be executed to the SPUs. It is to be noted that the PPU may execute a task by itself. Each SPU includes a register and further includes a sub processor as an entity of calculation execution and a local memory as a local storage area. The local memory may be used as the buffer memory 70.

The main memory 60 and the buffer memory 70 are storage apparatus and are each configured as a RAM (Random Access Memory). The SPU includes a dedicated DMA (Direct Memory Access) controller as a control unit and is capable of carrying out high-speed data transfer between the main memory 60 and the buffer memory 70. Further, the SPU can implement high-speed data transfer between the frame memory in the display processing unit 44 and the buffer memory 70. The control unit 100 in the present embodiment implements a high speed image processing function by causing a plurality of SPUs to operate in parallel. The display processing unit 44 is connected to the display apparatus 12 and outputs a result of image processing in accordance with a request from the user.

The information processing apparatus 10 according to the present embodiment loads part of image data from the hard disk drive 50 into the main memory 60 in advance in order to smoothly carry out a process of moving a display area of an image to be displayed as a content. Further, the information processing apparatus 10 decodes part of the image data loaded in the main memory 60 and stores the decoded image data into the buffer memory 70 in advance. This makes it possible to instantly switch an image to be used for rendering of the display image at a later required timing.

The data structure of an image as a display target in the present embodiment is not restricted particularly. Here, however, description is given of an example wherein hierarchical image data having a hierarchical structure is used in order to make it possible to display a high definition image in a higher efficiency. Hierarchical image data is image data including images of different resolutions generated by reducing the size of an original image to a plurality of stages. An image in each hierarchy is divided into one or a plurality of tile images. For example, an image of the lowest resolution is configured from one tile image. The original image which has the highest resolution is configured from the greatest number of tile images.

Figure 4:
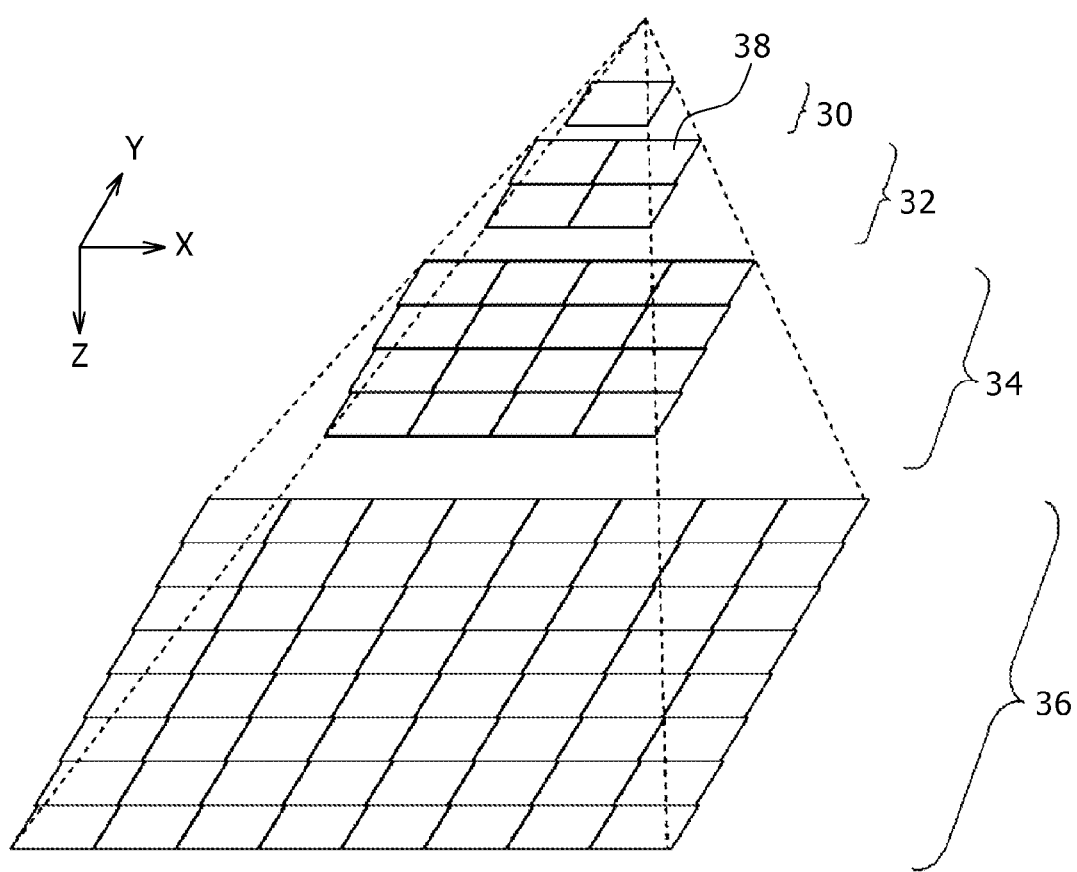
FIG. 4 is a conceptual view of a hierarchical structure of image data which can be used in the present embodiment.

When an image is displayed, enlarged display or reduced display is carried out quickly by switching a tile image used for rendering to another tile image of a different hierarchy when the display image reaches a predetermined resolution. Image data having such a hierarchical structure as just described is hereinafter referred to as "hierarchical data." FIG. 4 shows a conceptual view of the structure of hierarchical data. The hierarchical data has a hierarchical structure configured from a 0th hierarchy 30, a first hierarchy 32, a second hierarchy 34, and a third hierarchy 36 in the depthwise (Z axis) direction. It is to be noted that, although FIG. 4 only shows four hierarchies, the number of hierarchies is not restricted to this.

The hierarchical data illustrated in FIG. 4 has a quadtree hierarchical structure. Each hierarchy is configured from one or more tile images 38. All of the tile images 38 are formed to have an equal size having an equal number of pixels and have, for example, 256×256 pixels. The image data in the hierarchies are representations of an image in different resolutions. The original image in the third hierarchy 36 having the highest resolution is reduced in a plurality of stages to generate the image data of the second hierarchy 34, the first hierarchy 32, and the 0th hierarchy 30. For example, the resolution in an Nth hierarchy (N is an integer equal to or greater than 0) may be ½ the resolution of the (N+1)th hierarchy in both the horizontal (X axis) direction and the vertical (Y axis) direction.

In the information processing apparatus 10, the hierarchical data are stored in a format compressed by a predefined compression method in a storage apparatus such as the hard disk drive 50. The hierarchical data are read out from the storage apparatus and decoded before they are displayed on the display apparatus 12. The information processing apparatus 10 according to the present embodiment has a decoding function compatible with a plurality of compression methods. For example, the information processing apparatus 10 is capable of decoding compressed data of the S3TC format, JPEG format, and JPEG2000 format.

As shown in FIG. 4, the hierarchical structure of the hierarchical data is set defining the horizontal direction as the X axis, the vertical direction as the Y axis and the depth direction as the Z axis and constructs a virtual three-dimensional space. The information processing apparatus 10 derives an amount of change of a display area from a viewpoint moving request signal supplied from the inputting apparatus 20. Then, the information processing apparatus 10 uses the amount of change to derive coordinates (frame coordinates) of the four corners of a frame in the virtual space. It is to be noted that the information processing apparatus 10 may derive, in place of the frame coordinates in the virtual image, information which specifies a hierarchy and texture coordinates (UV coordinates) in the hierarchy. In the following description, also a combination of hierarchy specification information and texture coordinates is referred to as frame coordinates.

Frame coordinates are used for the determination of a link hereinafter described, for the loading of compressed data into the main memory, for a rendering process of a display image and so forth. It is to be noted that data of an image as a display target in the present embodiment may not have a hierarchical structure as described hereinabove, or only part of a plurality of image data which configure a content may be hierarchical data. In the following description, such data including also hierarchical data are referred to as "image data."

The information processing apparatus 10 according to the present embodiment has a function of switching, when triggered by satisfying such a predetermined condition that a display area moved by a viewpoint moving operation of the user is included in a certain area set in an image being displayed, the display target to a different image which has been mapped with the area. Such switching between images is hereinafter referred to as "link," and a set area which is used as a trigger to generation of a link is hereinafter referred to as "link area."

Figure 5:
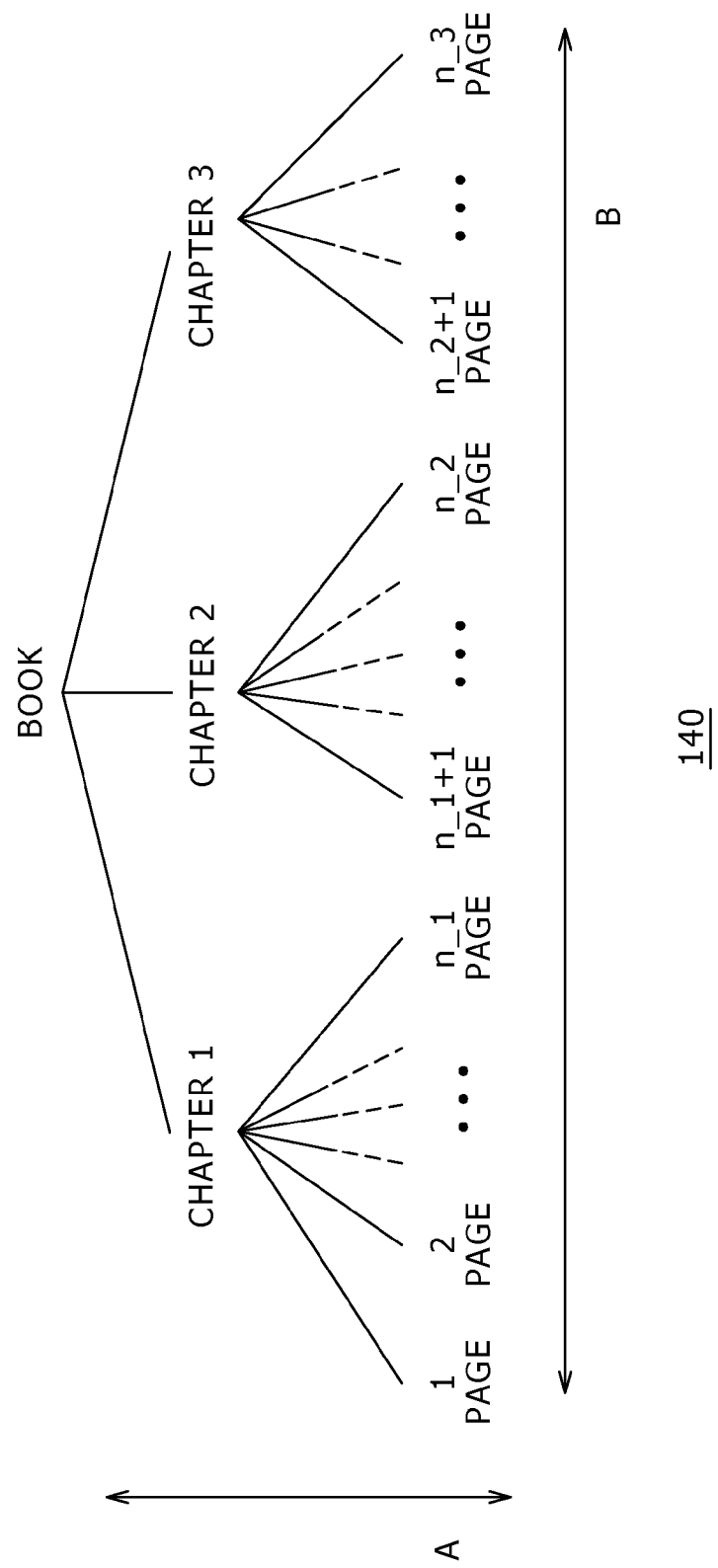
FIG. 5 is a diagram illustrating a structure of information displayed as a content in the present embodiment taking an electronic book as an example.

FIG. 5 illustrates a structure of information to be displayed as a content in the present embodiment where an electronic book is taken as an example. Generally, a book is configured from a plurality of factors such as a cover, a table of contents and a text. If natures of the factors are taken into consideration, then the book can be perceived as information having a tree structure configured from hierarchical nodes. The hierarchical nodes include a root node provided by the cover, an internal node provided by the table of contents, and a leaf node provided by the text. The root node provided by the cover represents the entire book, and an internal node represents a page range such as a chapter. Further, a leaf node represents a page of the text which is a minimum unit. The information structure example 140 of FIG. 5 is a tree structure of a book wherein "chapter 1" ranges from "page 1" to "page n_1"; "chapter 2" from "page n_1+1" to "page n_2"; and "chapter 3" from "page n_2+1" to "page n_3."

In order to access a page, which the user wants to read, of a book having such a structure as described above, routes of two directions including a direction A in which a book, a chapter and a page to be accessed are traced in order and a direction B in which pages are traced successively or a route of a combination of the directions are available. Specifically in a book such as a picture book or an instruction manual which is frequently read beginning with an intermediate page, a desired page can be accessed efficiently by successively tracking a route from the direction A to the direction B. Therefore, in the present embodiment, images corresponding to the nodes are prepared and selected as a display target, and while special qualities of the routes of the direction A and the direction B are taken into consideration, smooth image transition having continuity is implemented to facilitate accessing to information.

It is to be noted that, although FIG. 5 shows the simplest example of the structure of a book, the category of the content is not restricted specifically if a similar tree structure can be constructed from the content. For example, picked up photographs may be set as leaf nodes, and additional information such as an image pickup date and an image pickup place may be set as an internal node. In this manner, various kinds of information which can be displayed as images may be classified based on some reference to construct a tree structure. Further, the number of hierarchies of the tree structure is not restricted.

Figure 6:
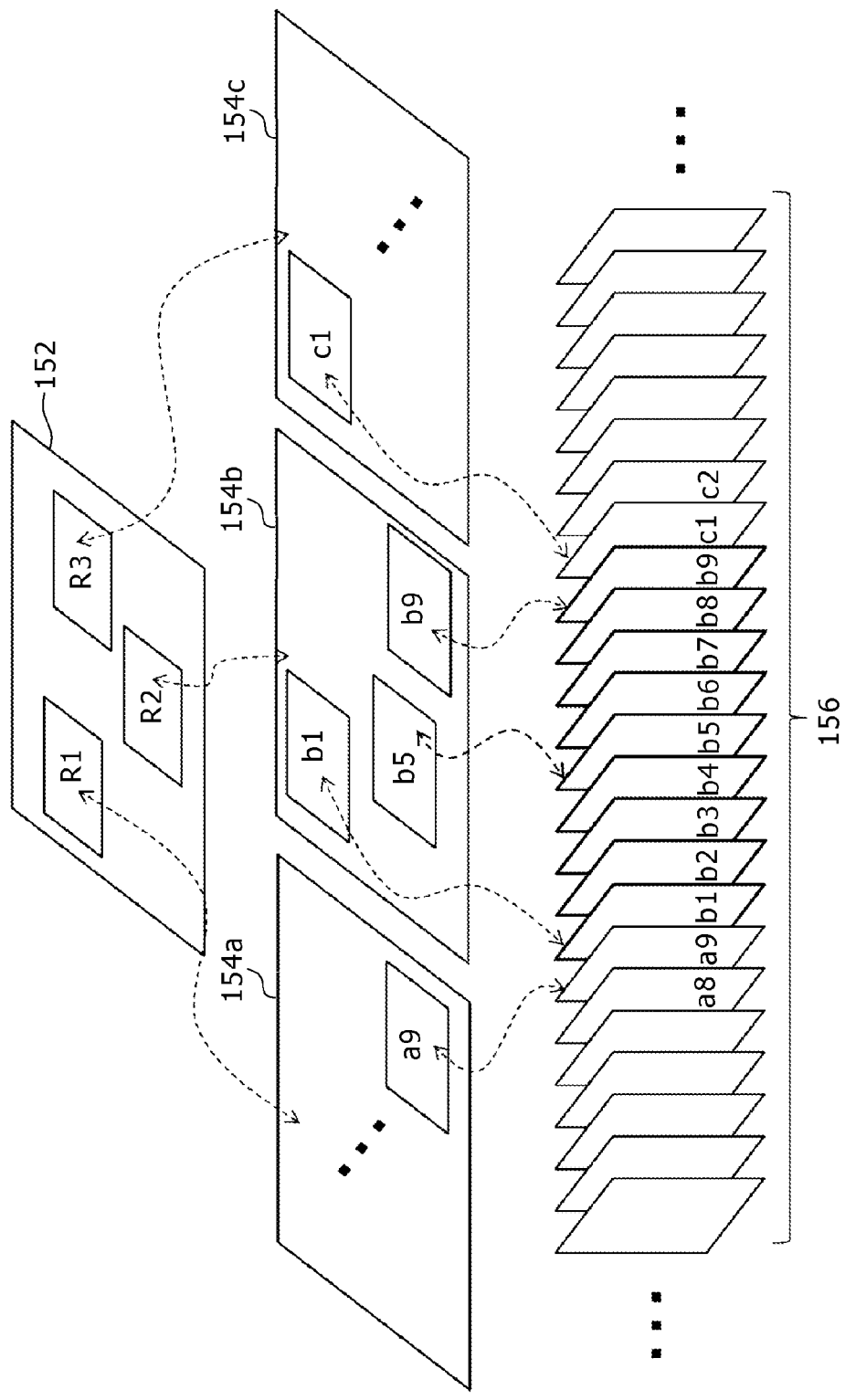
FIG. 6 is a view schematically illustrating a relationship between images prepared for nodes and images set by links in order to display a content in the present embodiment.

FIG. 6 schematically illustrates a relationship between images prepared for the nodes in order to display a content whose tree structure is constructed and images set by links. Referring to FIG. 6, an image 152 corresponds to the root node; images 154a, 154b and 154c correspond to the internal nodes; and a plurality of images 156 individually correspond to the leaf nodes. The image 152 corresponds to the cover of the content and has links set to the images of the internal nodes of the lower hierarchy. In FIG. 6, three areas "R1," "R2" and "R3" are link areas to which links to the images 154a, 154b and 154c of the internal nodes are set.

When a predetermined link condition is satisfied such that, in a state in which the image 152 is displayed on the display apparatus 12, the user moves the display area so that the viewpoint approaches the link area "R1" until the display area is included into the link area "R1," the display target is switched from the image 152 to the image 154a. Similarly, when the display area satisfies a link condition set for the link area "R2," the display target is switched to the image 154b. Further, when the display area satisfies a link condition set for the link area "R3," the display target is switched to the image 154c. In each link area of the image 152, an object or a figure from which the fact that the area is a link area and an attribute of a link destination can be discriminated is indicated.

In the case of the book exemplified in FIG. 5, images or figures from which "chapter 1," "chapter 2" and "chapter 3" can be recognized are indicated in the link area "R1," link area "R2" and link area "R3," respectively. If the unique nature that an image as the display target is switched by a moving operation of the viewpoint is utilized in the following manner, then seamless image switching can be implemented. In particular, for example, an image obtained by reduction of the image 154a is placed in the link area "R1"; an image obtained by reduction of the image 154b is placed in the link area "R2"; and an image obtained by reduction of the image 154c is placed in the link area "R3." Then, the same object is displayed at the same position on the screen before and after the switching.

To each of the images 154a, 154b and 154c corresponding to the internal nodes, a link to an image of a node of an upper hierarchy, in FIG. 6, of the root node, and a link to an image of a node of a lower hierarchy, in FIG. 6, of a leaf node, are set. The links to the image of the root node are set conversely to the links from the image of the root node to the images of the internal nodes. In other words, an image to be displayed first upon execution of a link is an image of a corresponding link area in the image 152 of the root node.

Also the links from an image of each internal node to images of leaf nodes are basically similar to links from an image of the root node to images of the internal nodes. In the example of the book of FIG. 5, the images of the internal nodes correspond to the chapters, and the link destinations of the images are images of pages. To the link area "a9" of the image 154a, the link areas "b1," "b5" and "b9" of the image 154b and the link area "c1" of the image 154c, links to images represented as images "a9," "b1," "b5" and "b9" from among the images 156 of the leaf nodes are set, respectively.

Similarly as in the case of the image 152 of the root node, when a predetermined link condition is satisfied such that the user moves, in a state in which one of the images 154a, 154b and 154c is displayed on the display apparatus 12, the display area so that the viewpoint approaches one of the link areas until the display area is included into the link area, the display target is switched to an image set as the link destination from among the images 156 of the leaf nodes. Seamless image switching can be implemented if an image obtained by reducing an image of the link destination is placed in each link area of an image of an internal node.

For example, when the display target is to be switched from an image of the link area "b1" of the image 154b of the internal node to the image "b1" of the link destination from among the images 156 of the leaf nodes, an object representative of the link area "b1" of the image 154b and an object in the image "b1" of the link destination are displayed at the same position of the screen. Each of the images 156 of the leaf nodes is, in the example of the book of FIG. 5, an image for one page or an image for two pages corresponding to a double-page spread of the book.

On the other hand, the leaf nodes have, in addition to a connection between different hierarchies in the tree structure, a connection by order of the leaf nodes themselves. In particular, although images which configure the images 156 of the leaf nodes form separate groups depending upon the internal nodes, if attention is paid only to the leaf nodes, then the images of the leaf nodes form an image sequence having continuity as illustrated in FIG. 6. This connection corresponds to the direction B of FIG. 5. In an actual book, even if an intermediate page is opened based on the table of contents or the index, the book is frequently read in order of pages in accordance with a range within which a sentence or an article extends.

Taking this nature into consideration, it is made possible to switch the image based on the order of the leaf nodes as illustrated in FIG. 6. In particular, switching of an image between hierarchies of the tree structure is implemented based on information of the spatial disposition on the images, and switching of an image between leaf nodes is implemented based on the order of the leaf nodes. Switching of an image between leaf nodes is carried out by inputting means of the inputting apparatus 20 to which an image successive feeding operation function is allocated. For example, in the case of a book which is read from the left to the right of a double-page spread page, if the R button 29b of the inputting apparatus 20 is allocated to page feeding and the L button 29a is allocated to page returning, then a natural operation can be anticipated.

If image switching between leaf nodes is made possible in this manner, then it becomes unnecessary to set, to an image of an internal node, links to the images of all of the leaf nodes. While, in the example illustrated in FIG. 6, the group of images of leaf nodes under the image 154b of an internal node includes nine successive images "b1" to "b9," only the links to the images "b1," "b5" and "b9" of the nine images are set to the image 154b of the internal node. The image of a leaf node to which a link is to be set is determined suitably in accordance with the display substance or the like.

Switching from an image of a leaf node to an image of an internal node is carried out by operating one of the inputting means allocated to one of the inputting apparatus 20 for returning to an image of an internal node. In order to specify the returning destination at this time, when a link from a link area in an image of the internal node to an image of the leaf node is executed, the image of the internal node and identification information of the link area are temporarily stored into a register or the like not shown. Then, when an operation for returning the display to the image of the internal node is carried out, the display is switched to the image of the original link area basically based on the identification information.

On the other hand, when, after a leaf node is reached, the display is to be returned to an internal node after a successive feeding operation is carried out between leaf nodes, the link area of the returning destination is switched based on the amount of movement between the leaf nodes. For example, a boundary is set for the permutation of images of the leaf nodes in advance, and when the boundary is reached by a successive feeding operation of the image, the identification information stored in the register is rewritten into identification information of the next link area. Here, the "next link area" is an area of the link source of an image which is the next link destination of the internal node in the direction in which the image is fed. If the internal node of the link source is changed to that of a different image, then also the identification information of the image is rewritten.

As a result of this, when the display target is changed from an internal node to a leaf node and then returns from a different leaf node to the internal node after it is moved between leaf nodes, a link area and an image of the returning destination which becomes an exit in response to the position of the leaf node at the point of time can be varied appropriately. For example, if, in the example illustrated in FIG. 6, the display is switched from the link area "b1" of the image 154b of an internal node to the image "b1" of a leaf node and then returns to the internal node after the image is fed in order until the display is progressed to the image of "b9," then the area "b9" of the image 154*b* is displayed. Similarly, when the display is progressed to the image of "c1" and then is to return to the internal node, the area "c1" of the image 154*c* is displayed.

When the display is to return from an image which is not a link destination from an internal node such as the image "b2," "b3," "b4," "b6," "b7" or "b8" from among the images 156 of the leaf nodes to an image of an internal node, the display is switched from the image "b2," "b3" or "b4" to the area "b1" or "b5" in the image 154*b* or from the image "b6," "b7" or "b8" to the area "b5" or "b9" in the image 154*b* in accordance with the setting of the boundary. Alternatively, no boundary may be set, and in this instance, an image which is a link destination may be searched for in a forward or backward direction of the permutation of the leaf nodes from the images of the leaf nodes such that the display is switched to the area of the link source of the searched out image. The search direction may be set in advance or may be settable by the user. In any mode, by preparing in advance information which maps identification information of those images as link destinations from the internal nodes from among images of the leaf nodes and the identification information of the images of the link sources and the link areas to each other, similarly to information which sets the links, the returning destination is specified utilizing a link set to a neighboring image. Alternatively, the returning destination may be specified by reversely looking up the link information set to the images of the internal nodes.

By changing the areas of internal nodes which become an entrance to and an exit from leaf nodes in response to movement between leaf nodes in this manner, it becomes easy to grasp the position at present in the information network and a guideline regarding which area is to be determined as a target in an internal node can be obtained. However, as hereinafter described, where an image of one leaf node can be reached through a plurality of routes, an internal node to be determined as an exit is selected taking the type of the internal node determined as the entrance into consideration. It is to be noted that, as occasion demands, the image may be fed in order among internal nodes in addition to leaf nodes.

It is to be noted that the data of images of the nodes may be hierarchical data or may be image data of a single resolution or else may be different among different images depending upon the range of the resolution required for the display. As described hereinabove, the switching of an image from the root node to that of a leaf node is implemented by scrolling or enlarging the image so that the viewpoint moves toward a link area. Switching of an image from an internal node to the root node is implemented by conversely moving the viewpoint away from the image being displayed.

Figure 7:
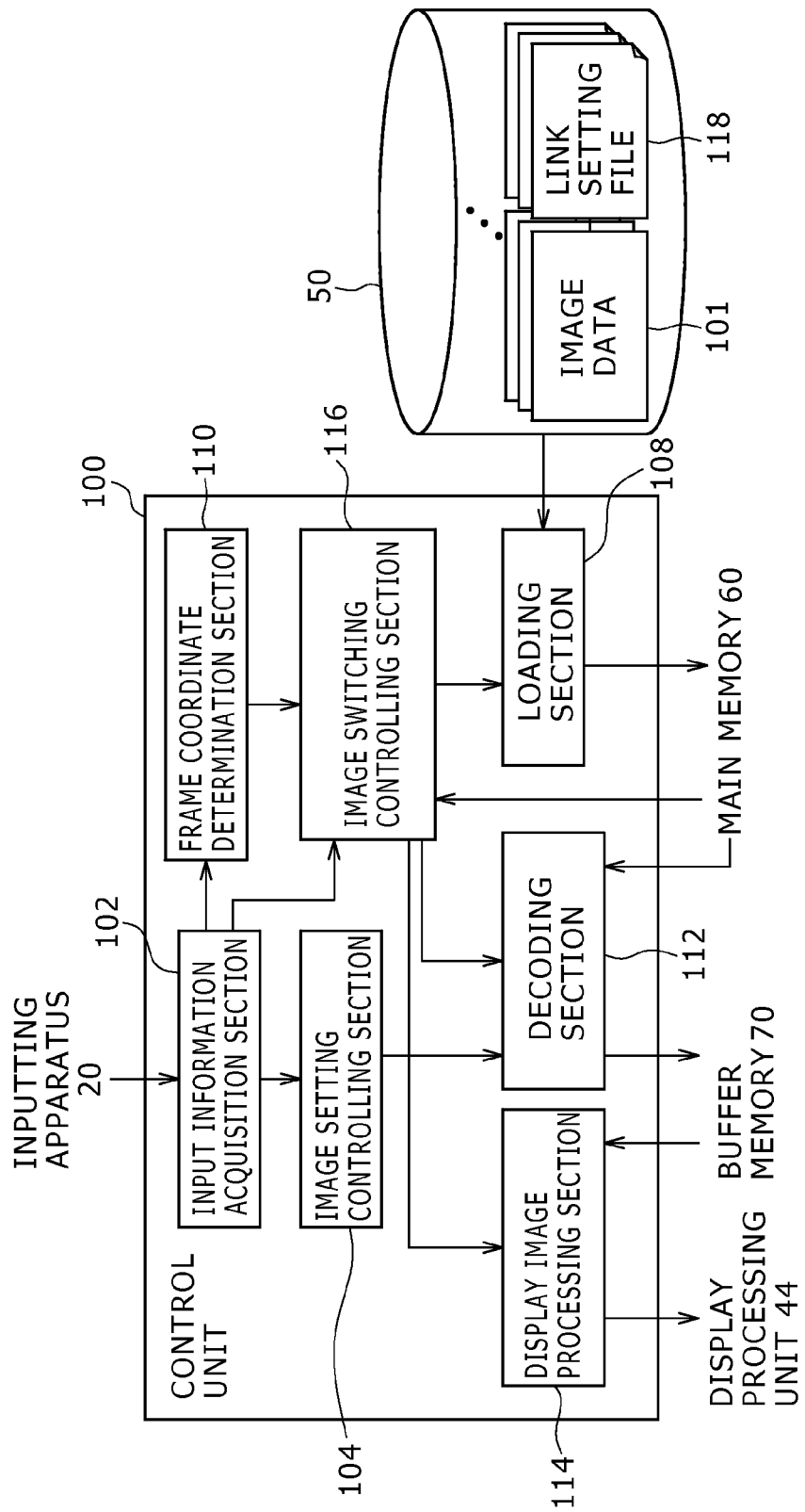
FIG. 7 is a view particularly showing a configuration of a control unit having a function of displaying an image of such a content as described above in the present embodiment.

FIG. 7 particularly shows a configuration of the control unit 100 having a function of displaying such an image of a content as described hereinabove in the present embodiment. The control unit 100 includes an input information acquisition section 102 for acquiring information inputted by the user through the inputting apparatus 20, a frame coordinate determination section 110 for determining frame coordinates of an area to be newly displayed, an image switching controlling section 116 for determining whether or not switching of an image as a display target is required by link setting, and a loading section 108 for loading required compressed image data from the hard disk drive 50. The control unit 100 further includes a decoding section 112 for decoding compressed image data, a display image processing section 114 for rendering an image frame, and an image setting controlling section 104 for changing an image of the same node at a given timing.

In FIG. 7, the elements indicated as functional blocks which carry out a variety of processes can be configured in hardware from a CPU (Central Processing Unit), a memory and other LSIs and in software from a program loaded in the memory or the like. As stated previously, the control unit 100 has one PPU and a plurality of SPUs, and the functional blocks can be formed singly or by a combination of the PPU and the SPUs. Accordingly, it will be recognized by those skilled in the art that the functional blocks may be implemented in a variety of manners only by hardware, only by software or by a combination of hardware and software, and they are not limited to any of them.

First, in the hard disk drive 50, a content file is stored which has a structure wherein image data 101 of the nodes exemplified in FIG. 6 and link setting files 118 in which information of links set for the image data 101 is described are mapped to each other. In the link setting files 118, information of link areas set for the images and identification information of the images of the link destinations by the links are described in a mapped relationship to each other. Where part of an image is set as a link destination, area information of the link destination is further mapped. The link setting files 118 include also a file in which information regarding a returning destination from a leaf node to an internal node described hereinabove is described. The image data 101 and the link setting files 118 mapped to the image data 101 are loaded into the main memory 60 at a necessary timing.

The hard disk drive 50 may further store, by an application or the like executed by the information processing apparatus 10, various data such as image data of an object to be displayed in addition to a program of a game and images having a tree structure described hereinabove. However, since a popular technology can be applied to them, the following description is given focusing on the function for carrying out image display described hereinabove.

The input information acquisition section 102 acquires the substance of an operation carried out for the inputting apparatus 20 by the user such as a starting/ending operation of image display, a viewpoint moving operation, a successive feeding operation of an image of leaf nodes or a switching operation from a leaf node to an internal node. The input information acquisition section 102 suitably notifies the frame coordinate determination section 110 and the image switching controlling section 116 of the acquired operation substance. The frame coordinate determination section 110 determines frame coordinates of a display area for a subsequent time instant from the amount of movement which is based on the frame coordinates of the display area at present and a viewpoint moving request inputted by the user. Then, the frame coordinate determination section 110 notifies the image switching controlling section 116 of the determined frame coordinates. The "subsequent time instant" here is a time instant after a cycle for updating display based on a frame rate. Further, the input information acquisition section 102 acquires information for the determination of a timing at which one image is to be changed from a different functional block not shown such as a functional block for executing a game or from a server and notifies the image setting controlling section 104 of the acquired information.

The image switching controlling section 116 reads out the link setting file 118 which has been loaded into the main memory 60 and corresponds to the image data as a display target and determines whether or not the display area for the subsequent time instant satisfies a link condition. If the display area satisfies the link condition, then the image switching controlling section 116 validates the link and acquires, from the link setting file 118, identification information for the image data of the link destination set in association with the link area and the area information of the link destination. If the link destination is an image of a leaf node, then the image switching controlling section 116 temporarily stores identification information of the image data of the link source and identification information of the link area into a register.

If the image switching controlling section 116 is notified from the input information acquisition section 102 during display of an image of a leaf node that a successive feeding operation of images is carried out, then it specifies identification information of the next image data. The specification is facilitated, for example, by including numbers representative of an order in the identification information of the images. Further, if the image switching controlling section 116 is notified from the input information acquisition section 102 that an operation for returning the image from that of a leaf node to that of an internal node is carried out, then it specifies the image data of the link source temporarily stored in the register and identification information of the link area. If a successive feeding operation of images has been carried out before then, then the image switching controlling section 116 suitably rewrites the identification information stored in the register as described above. The information relating to the image after the switching acquired by the procedure described above is transferred to the loading section 108, decoding section 112 and display image processing section 114. If there is no necessity to carry out image switching, then the image switching controlling section 116 notifies the loading section 108, decoding section 112 and display image processing section 114 of the frame coordinates of the display area for the next time instant.

The loading section 108 checks based on the information transferred thereto from the image switching controlling section 116 whether or not there is compressed image data to be loaded into the main memory 60 from the hard disk drive 50 and loads the compressed image data as occasion demands. The compressed image data to be newly loaded is the image data 101 after switching when the image as the display target is switched or like image data.

Upon image switching, if the image after the switching is hierarchical data, then a tile image of a hierarchy necessary to display an image determined as an initial image in advance such as image data of the 0th hierarchy, by which the resolution is lowest and the entire image can be displayed at a time, is loaded first. When new image data 101 is loaded, also a link setting file 118 mapped to the image data 101 is loaded.

When image data such as tile images of hierarchical data are to be loaded in a unit of a predetermined block, in response to a movement of the display area, image data of surrounding blocks are loaded irrespective of whether or not image switching is required. Alternatively, in accordance with a moving route of the display area till then, image data of blocks which are estimated to be required later are loaded. Further, if an operation for feeding images of the leaf nodes in order is carried out, then also succeeding image data in the order of images are loaded. The loading section 108 may load necessary image data at predetermined intervals of time at any time in addition to a timing when the user inputs a viewpoint moving request.

The decoding section 112 checks based on the notification from the image switching controlling section 116 whether or not image data necessary for the display area for the subsequent time instant is included in the decoded image data stored in the buffer memory 70. If the image data is not included in the decoded image data, then the decoding section 112 reads out and decodes necessary compressed image data from the main memory 60 and stores the decoded image data into the buffer memory 70. Since data of images over a wide range including the display area at present are decoded and stored in the buffer memory 70 in advance, smoother movement of the display area can be implemented. Further, by making it possible to retain also data of an image of the link source having been displayed before the switching of the display image, a returning process for the display image can be carried out quickly.

The display image processing section 114 reads, based on the notification from the image switching controlling section 116, image data necessary for the display area for the subsequent time instant from the buffer memory 70 as occasion demands and renders the image data in the frame memory of the display processing unit 44. The image setting controlling section 104 acquires information for the determination of a timing at which the image is to be changed from the input information acquisition section 102. Then, the image setting controlling section 104 controls the decoding section 112 so that the image of a predetermined node is changed at a timing based on the acquired information. The information for the determination of a timing at which the image is to be changed is the degree of progress in a game, whether or not a fee has been paid by the user, and so forth. Cooperation of the image setting controlling section 104 and the decoding section 112 is hereinafter described in detail.

Figure 8:
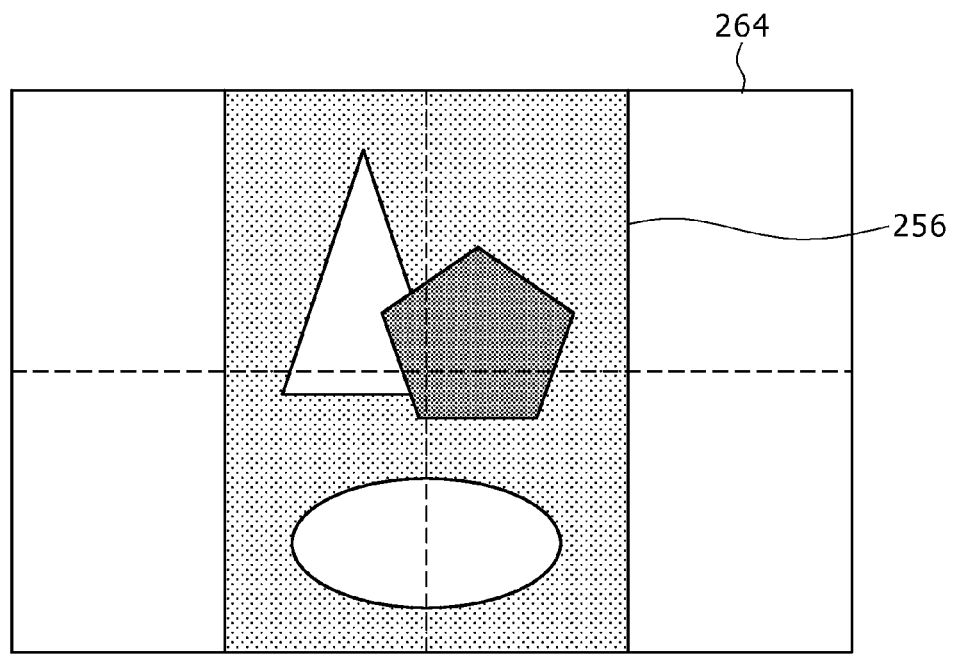
FIG. 8 is a view illustrating a positional relationship between an area which is a reference for a frame parameter and an image in the present embodiment.
Figure 9:
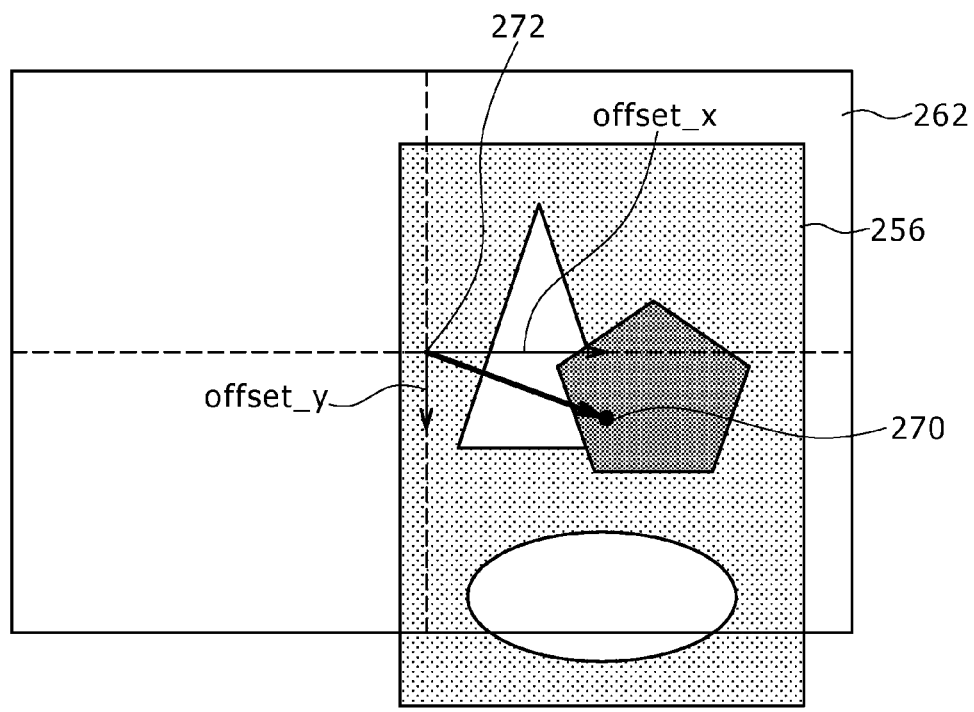
FIG. 9 is a view illustrating a frame parameter of an area in which a reference frame is moved on an image plane in the present embodiment.
Figures 10, 11:
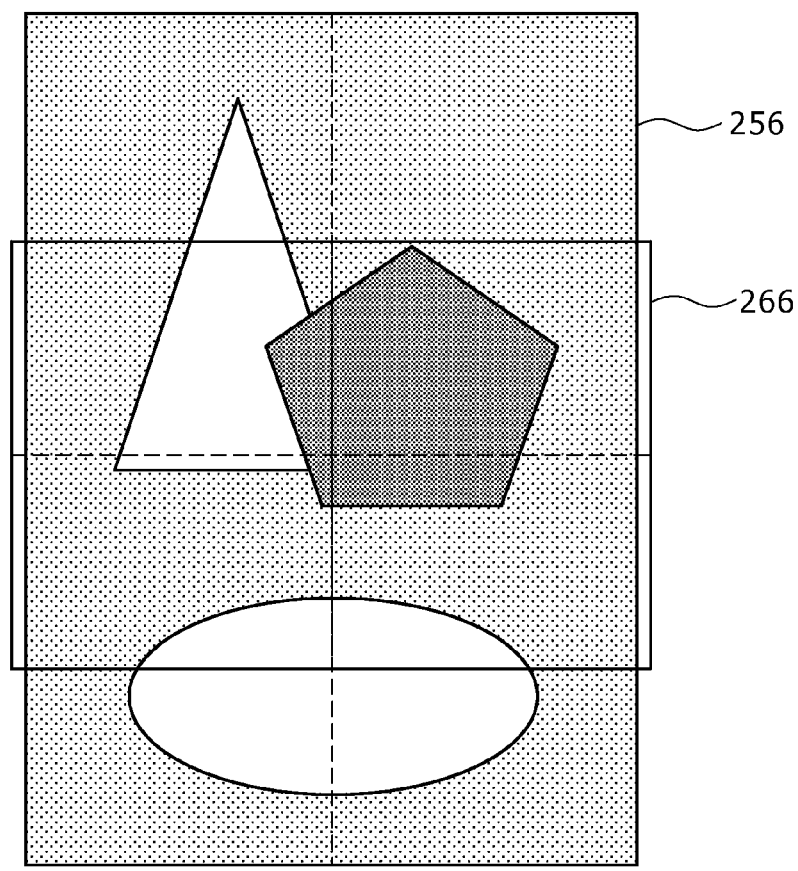
FIG. 10 is a view illustrating a frame parameter of an area in which an enlargement factor is changed without moving the reference frame on the image plane in the present embodiment.
FIG. 11 is a view illustrating an example of a data structure of a link setting file described using a frame parameter in the present embodiment.

Now, an example of setting of the link setting file 118 is described. FIGS. 8 to 10 are views illustrating a definition of a frame parameter used in the link setting file 118. The frame parameter is a parameter representative of an area on an image plane of a display target and is used for setting of a link area or an area which is to be displayed after switching in an image of a link destination.

FIG. 8 illustrates a positional relationship between an area used as a reference for the frame parameter and an image. Referring to FIG. 8, a reference frame 264 for an image 256 is a rectangle which has a center same as the center of the image 256, circumscribes the image 256 and has an aspect ratio of a predetermined value. Here, the aspect ratio may have a predetermined value and is, for example, equal to the aspect ratio of the display unit used for display or the display area of the display unit. It is assumed that, even if the display image is enlarged or reduced, the set area always has the ratio.

The position and the magnitude of the area are represented by the frame parameter including three parameters of a horizontal offset, a vertical offset and an enlargement factor when each of the horizontal side and the vertical side of the reference frame 264 is represented by 1. In particular, a coordinate system unique to the image 256 is determined based on the reference frame 264. The frame parameter of the reference frame 264 itself is (horizontal offset, vertical offset, enlargement factor)=(0, 0, 1.0).

FIG. 9 is a view illustrating the frame parameter in an area in which the reference frame is moved on the image plane. In this instance, a value is substituted into each of the parameters of the vertical offset and the horizontal offset. In particular, a horizontal component offset_x and a vertical component offset_y of a distance from a center 272 of the area to a center of the image 256, namely, to a center 270 of the reference frame, are values of the horizontal offset and the vertical offset, respectively. Accordingly, an area 262 is represented as (offset_x, offset_y, 1.0).

FIG. 10 is a view illustrating the frame parameter of an area in which the enlargement factor is changed without moving the reference frame on the image plane. In this instance, the area ratio of an area 266 to the reference frame is substituted into the parameter of the enlargement factor. If the area 266 of FIG. 10 is 0.5 times the area of the reference frame 264 of FIG. 8, then the area 266 is represented as (0, 0, 0.5).

FIG. 11 illustrates an example of a data structure of a link setting file described using the frame parameter. In a link setting file 300, one row corresponds to one link, namely, to switching from corresponding image data to different image data. The link setting file 300 is configured from four different fields including a link source image frame field 302, a valid scale range field 304, a link destination file field 306 and a link destination image frame field 308. The link source image frame field 302 designates a link area to be set on a corresponding image with the frame parameter described above.

The valid scale range field 304 designates an inclusion relationship between a link area and a display area when the link is valid. In particular, when the value of the valid scale range field 304 is in the positive, if the display area includes the link area, then the link is determined as valid. When the value is in the negative, if the link area includes the display area, then the link is determined as valid.

In the first row of FIG. 11, the valid scale range field 304 has a positive value, and therefore, switching of an image is carried out in a direction in which the screen image is zoomed out to enlarge the display area. In other words, a link to a node of an upper hierarchy is set. Meanwhile, in the second row of FIG. 11, since the valid scale range field 304 has a negative value, switching of an image is carried out in a direction in which the screen image is zoomed in to reduce the display area. In other words, a link to a node of a lower hierarchy is set.

The link destination file field 306 designates identification information of image data of the link destination. The link destination image frame field 308 designates the display area after the image switching, namely, the display area in an image designated by the link destination file field 306 using the frame parameter for the image.

Where such a link setting file is produced in a mapped relationship to each image data, transition between nodes of different hierarchies can be implemented by similar processes for both of a lower hierarchy direction and an upper hierarchy direction. It is to be noted that, upon transition in the upper hierarchy direction, since the transition destination is restrictive from the tree structure, the link source image frame field 302 and the valid scale range field 304 may be omitted to simplify setting. Then, if a function for returning to a node of an upper hierarchy is allocated to one of the inputting means of the inputting apparatus 20, then in whichever state the display area is in an image of a lower hierarchy node being displayed, switching of display to an upper hierarchy node can be carried out immediately.

Figures 12, 13:
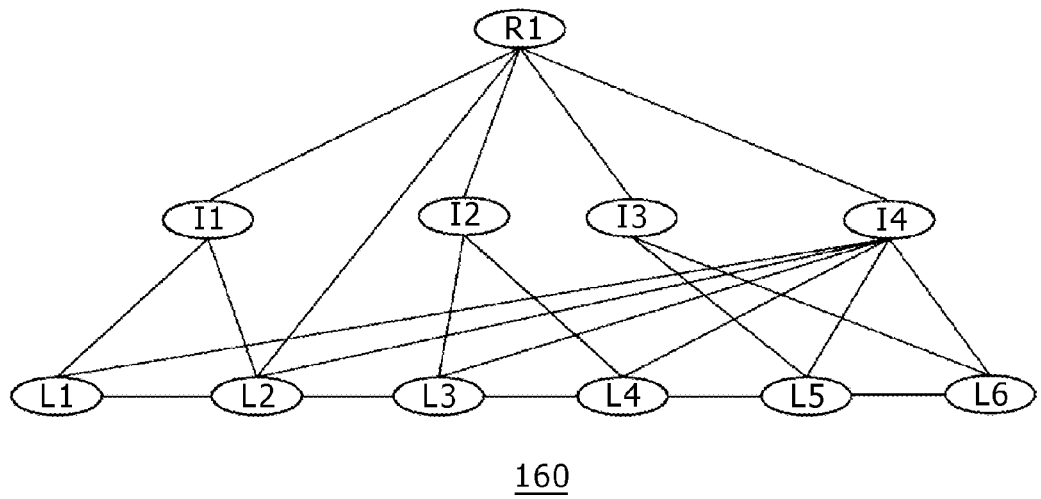
FIG. 12 is a view illustrating a display mode when a plurality of arrival routes to a leaf node are provided in the present embodiment.
FIG. 13 is a view illustrating information to be mapped in order to carry out a process of flagging link setting information to be validated in response to a type of an internal node having been used as an entrance in the present embodiment.

The mode described above is directed to a case in which only one route is available from the root node to one leaf node. However, also it is possible to provide a plurality of reaching routes to a leaf node depending upon like setting. FIG. 12 is a view illustrating a display mode when such a structure as just described is constructed. An information configuration example 160 is configured from a root node "R1," internal nodes "I1," "I2," "I3" and "I4" and leaf nodes "L1," "L2," "L3," "L4," "L5" and "L6."

The leaf nodes "L1" and "L2" can be reached from the internal node "I1"; the leaf nodes "L3" and "L4" from the internal node "I2"; and the leaf nodes "L5" and "L6" from the internal node "I3." This is similar to that in the mode described hereinabove. Further, in the mode of FIG. 12, all leaf nodes can be reached from the internal node "I4."

Such a structure as just described can be obtained, for example, if, in the case of an electronic book, the internal node "I4" is provided as a node which allows selection of an arbitrary page irrespective of a chapter in addition to the internal nodes "I1," "I2" and "I3" corresponding to the "chapter 1," "chapter 2" and "chapter 3" illustrated in FIG. 5. The image of the internal node "I4" may be, for example, a thumbnail image in which reduced images of the images of all pages are arrayed two-dimensionally. Thus, if the display area is moved so that the viewpoint approaches one of the reduced images in a similar manner as described above, then the display is switched to an image of a leaf node corresponding to the reduced image.

Further, in the example of FIG. 12, the leaf node "L2" can be reached directly from the root node "R1." For example, an image estimated to have a particularly high display frequency from among the images of the leaf nodes, an image of the top page from which the main subject is entered or a like image may be determined as an image to which the display can be switched directly from the image of the root node "R1." Alternatively, it may be made possible for the user to set such that the display can be switched directly to an image of a favorite page. Also in those cases, a link to an image of the leaf node "L2" may be set for the image of the root node "R1." Where a plurality of routes to a leaf node are provided in this manner, the user can select a reaching method for a desired image in response to a situation, and consequently, the access efficiency to information is improved. It is to be noted that, between the leaf nodes illustrated in FIG. 12, a further leaf node to which no link is set from the internal nodes as described hereinabove may exist.

Although, in FIG. 12, only one internal node "I4" from which all leaf nodes can be reached is additionally provided, a plurality of kinds of internal nodes may be prepared by a classification method of leaf nodes. For example, where the leaf node images are profile images of persons, country names where the persons are classified by nationality, distinctions between men and women where the persons are classified by sex, age groups where the persons are classified by age and so forth can be set as internal nodes. By such setting, the internal nodes are used as search keys, and a role as a search function can be provided.

When the display returns from an image of a leaf node to an image of an upper hierarchy as described above, the display is switched to an image of an internal node of a link which itself is a link destination or of a link source of a link whose link destination is a neighboring image. Here, if a link is set to images of a plurality of internal nodes while an image of one leaf node is set as a link destination as seen in FIG. 12, then a link of an image of an internal node of the type same as that of the image of the internal node which was an entrance to the leaf node, namely, the image of the internal node which has been displayed most recently, is determined as valid.

For example, in the foregoing description given with reference to FIG. 12, the internal nodes "I1," "I2" and "I3" are of the same type, and the internal node "I4" is of a type different from that of the internal nodes "I1," "I2" and "I3." Here, where the image of the leaf node "L1" is displayed using the image of the internal node "I1" as an entrance and the display returns to the internal node after it is progressed to the image of the leaf node "L3," the image of the internal node "I2" of the type same as that of the internal node "I1" is determined as an exit.

On the other hand, where the image of the leaf node "L1" is displayed using the image of the internal node "I4" as an entrance and the display returns to the internal node after it is progressed to the image of the leaf node "L3," the image of the internal node "I4" same as the entrance is determined as an exit. This similarly applies to a case in which a plurality of types of internal nodes are produced by a classification method as described above. For example, where a profile image is displayed from an image of a certain country name, also when the display returns, the link destination is an image of a country name. It is to be noted that, in the present example, depending upon a situation of a successive feeding operation between profile images, the display may return to an image of a different country name.

In order to implement such a mode as just described, the types of internal nodes whose link destination is images of leaf nodes are recorded and, upon transition from an internal node to a leaf node, a link to be validated is flagged in response to the type of an internal node which is used as an entrance. FIG. 13 is a view illustrating information to be mapped in order to carry out such a process as just described. In an information mapping table 170, identification information of image data of leaf nodes set as link destinations from internal nodes are described in an image data field 170a. Further, identification information of image data of the internal nodes whose link destination is the images and information of link areas which become a link source are mapped each other in a link source image/link area field 170b. Further, the types of the internal nodes and flags representative of whether or not a link is to be validated are mapped in a type field 170c and a flag field 170d, respectively.

The example of FIG. 13 illustrates a case in which two or three routes which reach each leaf node exist as illustrated in FIG. 12. For example, if the identification information of the image data of the leaf node "L1" of FIG. 12 is represented by "L1image," then two images having the identification information "I1" and "I4" exist as images of internal nodes whose link destination is the image of the leaf node "L1." The link sources of the two images are link areas "region1" and "region1'." It is to be noted that "region1" or "region1'" representative of an area may be identification information of a link area in this manner or may be a frame parameter in an image or the like.

This similarly applies also to image data "L2image" of the leaf node "L2" and image data "L3image" of the leaf node "L3." In particular, three link areas "I1/region2," "I4/region2'" and "R1/region2''" become the image/link source of an internal node whose link destination is the former image data "L2image." Meanwhile, link areas "I2/region3" and "I4/region3'" become the image/link source of an internal node whose link destination is the latter image data "L3image." It is to be noted that the corresponding relationship of the image data field 170a and the link source image/link area field 170b corresponds to a link described in a link setting file mapped to each image data of the internal nodes.

If it is assumed that, as described hereinabove, the internal nodes "I1," "I2" and "I3" are thumbnails of the class by "chapter" of the electronic book and the internal node "I4" is a thumbnail of no class, then in the type field 170c, such information as "chapter" or "thumbnail" for the identification of the class mapped to each internal node or "cover" mapped to the root node "R1" is recorded. Further, if the entrance to the leaf node "L1" is the internal node "I1," then the image switching controlling section 116 stores the image data of the link source and the identification information "I1/region1" of the link area into a register. Further, the image switching controlling section 116 flags the internal nodes of the same type from among the internal nodes of the information mapping table 170. In the example of FIG. 13, the value in the flag field 170d of the internal node with regard to which the type field 170c is "chapter" is "1."

Then, upon transition from a leaf node to an internal node, the display is switched to a link source of an internal node whose flag is in a set state. Upon transition from the leaf node "L3" whose image data is "L3image" in the example of FIG. 13 to an internal node, the link area "region3" in the image of the internal node "I2" whose flag is in a set state in the flag field 170d is displayed. Once the display transits from the leaf node to the internal node, then all flags in the flag field 170d are reset to "0."

Actually, in response to switching of the image to "L1," "L2" and "L3" between leaf nodes, the information stored in the register is successively rewritten to "I1/region1," "I1/region2" and "I2/region3" by selecting those internal nodes with regard to which the flag is in a set state. Also where a node which is not a link destination exists among "L1," "L2" and "L3," the information is successively rewritten in a similar manner at a point of time at which a boundary set in advance is crossed over.

If the display enters a leaf node from the internal node "I4," then the value in the flag field 170d for the internal node with regard to which "thumbnail" is indicated in the type field 170c is set to "1." As a result, in response to switching of the image to "L1," "L2" and "L3" between the leaf nodes, the information stored in the register is successively rewritten to "I4/region1'," "I4/region2'" and "I4/region3'." Then, the display is switched from the leaf node "L3" to the link area "region3'" in the image of the internal node "I4." The information mapping table 170 may not actually be a single table if mapping of the fields is established.

Figure 14:
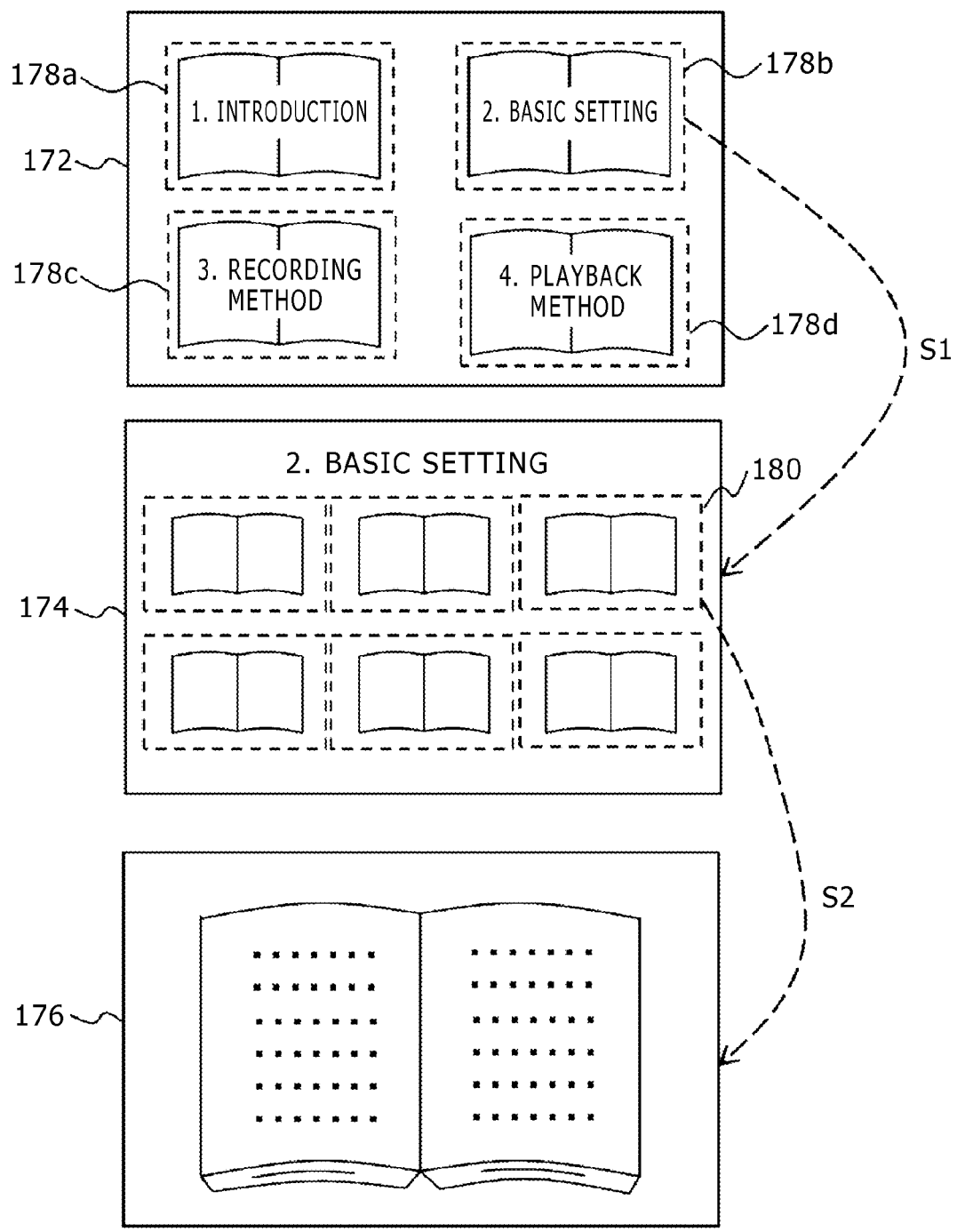
FIG. 14 is a view showing an example of an image of nodes of different hierarchies in which an electronic book is set in the present embodiment.

FIG. 14 illustrates an example of images of nodes of hierarchies where an electronic book is assumed. Referring to FIG. 14, the top stage represents an image 172 of the root node; the middle stage represents an image 174 of an internal node; and the bottom stage represents an image 176 of a leaf node. A broken line rectangle in all images represents a set link area but is not indicated on an actual image. Four link areas 178a, 178b, 178c and 178d are set in the image 172 of the root node. In each link area, an object representing that the area is a link area is indicated. In the example of FIG. 14, objects simulating double-page spreads of a book are indicated. Further, in each object, character information indicative of the substance of an internal node of the link destination is displayed in an overlapping relationship. In the example of FIG. 14, titles of chapters of the book such as "1. Introduction," "2. Basic setting," "3. Recording method" and "4. Playback method" are displayed.

If, during display of the image 172, zooming in is carried out so that the viewpoint approaches the link area 178b, then the display switches to the image 174 of an internal node of the link destination set for the link area (arrow mark S1). It is to be noted that, where it is focused that an image is switched seamlessly as described hereinabove, the image displayed in the link area 178b of the image 172 of the root node may be a reduced image of the image 174. This similarly applies also to the other link areas 178a, 178c and 178d.

Six link areas are set in the image 174 of the internal node. Each of the link areas corresponds to one of the images of the leaf nodes and represents, where the image of the leaf node is a double-page spread of a book, a reduced image of the leaf node. In the image 174 of the internal node, also character information representative of to which internal node the image displayed currently belongs is indicated as a title. In the case of FIG. 14, the character information is represented as "2. Basic setting." Where a large number of leaf nodes become a link destination, the internal node may be divided into a plurality of images. In this instance, similarly as upon transition between leaf nodes, the display may be switched between internal nodes in response to an operation for successively feeding images.

Then, if zooming in is carried out so that the viewpoint approaches a certain link area 180, then the display switches to the image 176 of the leaf node of the link designation set for the link area (arrow mark S2). This image represents the double-page spread of the book with a size with which characters are sufficiently readable as described hereinabove. Depending upon the substance of the content, a still image, a moving image or the like may be displayed in addition to characters, or they may be displayed in combination.

By an operation for returning the image from the image 176 to an image of an internal node, the display is switched from the image 176 of the leaf node to the image 174 of the internal node. At this time, the image displayed immediately after the switching is a portion of the link area 180 in the image 174. When the image 174 of the internal node is zoomed out until the entire image is displayed, the display is switched from the image 174 of the internal node to the image 172 of the root node. The image displayed immediately after the switching is a portion of the link area 178b in the image 172.

It is to be noted that the display in the example described above is switched to an image of the link destination using it as a trigger that the display area and the link area come to satisfy a predetermined condition by a viewpoint moving operation. However, another configuration may be adopted wherein a rectangular area indicated as a link area in FIG. 14 can be selected directly. For example, a target to be displayed emphatically from among rectangular areas which can be selected is moved by the directional keys 21 of the inputting apparatus 20 and is determined by the circle button 22 or the like to switch the display to an image of a link destination mapped to the rectangle. Upon switching, the display area may be automatically moved so that the selected rectangle may be zoomed up, whereafter the display is switched to the image of the link destination. In this instance, there is no necessity to set a link condition between the display area and the link area, or the display area may be moved so as to satisfy a link condition to carry out a link determination in an ordinary way.

Figure 15:
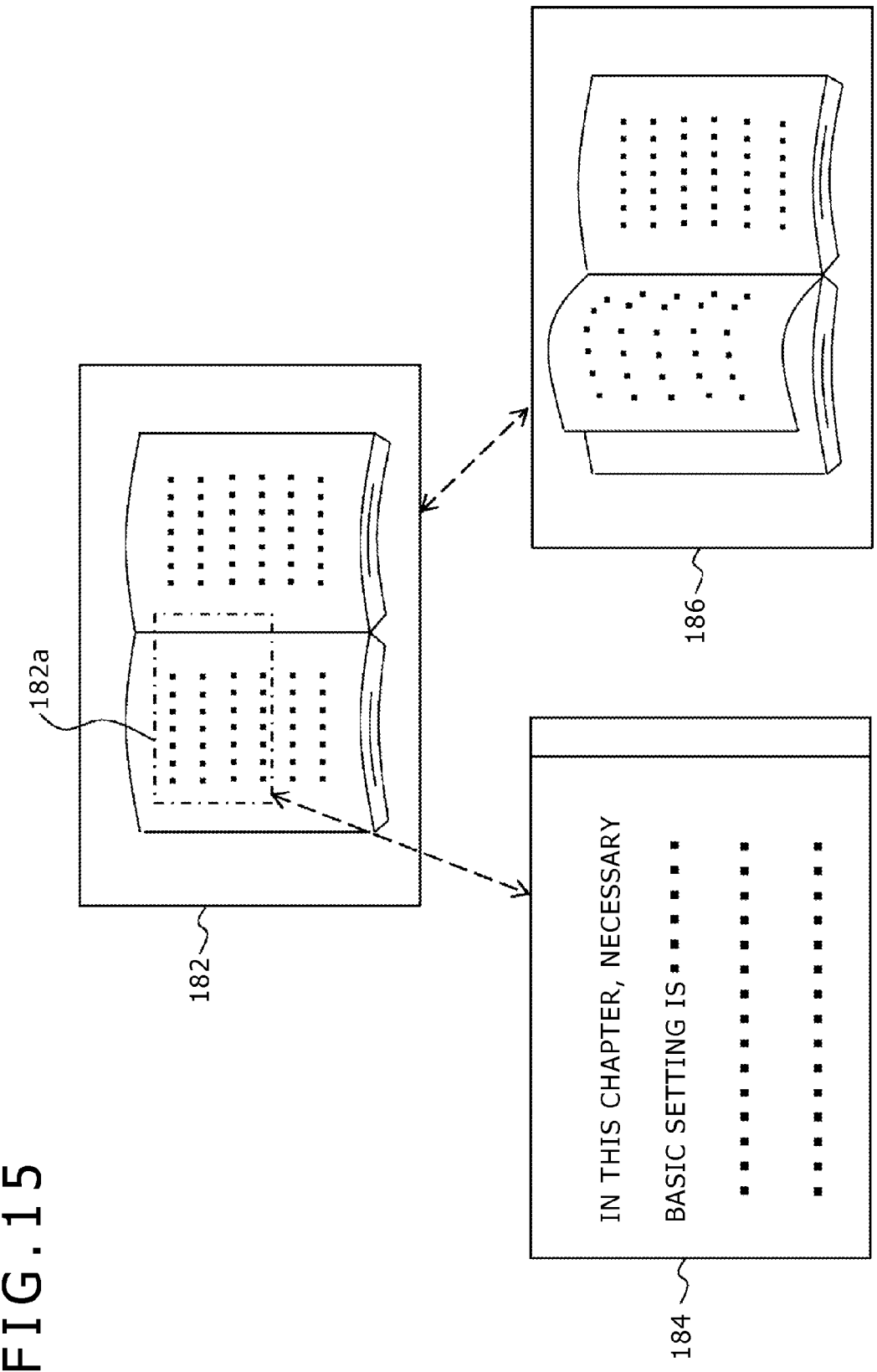
FIG. 15 is a view illustrating an example of a change of an image of a leaf node in the present embodiment.

FIG. 15 illustrates an example of a change in an image of a leaf node. In FIG. 15, the upper stage represents a basic image 182 of a leaf node and corresponds to the image 176 in FIG. 14. Also the image 182 of the leaf node accepts scrolling, enlarging and reducing operations. In particular, frame coordinates are determined in response to a viewpoint moving operation of the user, and an image at the location is displayed. In FIG. 15, an enlarged image 184 on the left side on the lower stage is an image obtained by zooming in the basic image 182 in an area 182a.

On the other hand, when an ordinary successive feeding operation for feeding the image forwardly or backwardly is carried out, the display is switched to a next image in the operation direction. At this time, preferably such working as to turn the page is carried out during switching as in the case of a page turning image 186 on the right side on the lower stage in the figure so that the continuity in page in the electronic book or the like can be recognized thereby to produce a sense of reality. Such working can be implemented using an existing computer graphics technology. The image after completion of the switching is similar to the image 182.

It is to be noted that, if an image successive feeding operation is carried out in a state in which the enlarged image 184 is displayed, then zooming out is carried out once to return the display to the basic image 182, and the image is switched to the page turning image 186 and to the image 182 after the switching. Consequently, it becomes definite that the image has been switched. Further, since a flow that zooming in to a desired area is carried out after the entire image is overviewed occurs naturally, the position at present in the information network can be grasped readily.

It is to be noted that the display may be successively switched among images in an order determined in advance in response to an operation of predetermined inputting means of the inputting apparatus 20 irrespective of whether the switching of the display image is carried out between hierarchies or between leaf nodes. For example, such an order as the image 172 of the root node, the image 174 of an internal node, the image 176 of a leaf node, an image of a next leaf node, ... may be prepared in advance similarly to the permutation of the images of leaf nodes such that the display image may be fed forwardly or backwardly including image switching between hierarchies by the same inputting means similarly to the operation for feeding images between leaf nodes. Alternatively, such a mode as just described and the mode of the switching procedure described hereinabove may be capable of being switched therebetween by the user.

Figure 16:
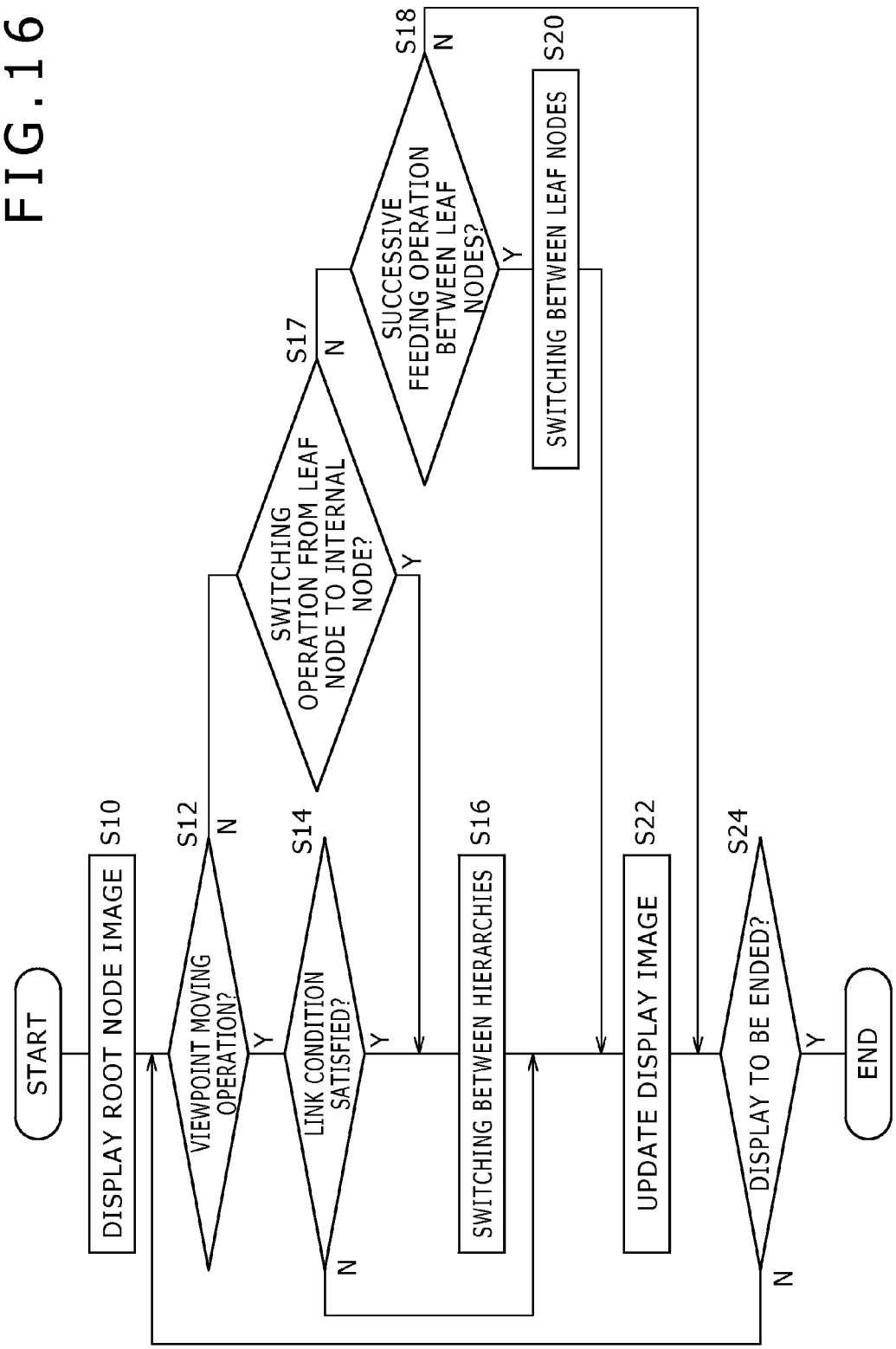
FIG. 16 is a flow chart illustrating a processing procedure when a display image is changed in response to an operation of a user by the information processing apparatus in the present embodiment.

Now, basic operation of the information processing apparatus 10 which can be implemented by the configuration described hereinabove is described. FIG. 16 is a flow chart illustrating a processing procedure by the information processing apparatus 10 for changing the display image in response an operation by the user. This flow chart is started when the information processing apparatus 10 is caused to carry out an operation for selecting and starting display of a content by the user or in a like case. This operation may be carried out by calling a menu screen provided by an application for a game or the like being executed separately.

First, the entire image of the root node is displayed as an initial image by cooperation of the image switching controlling section 116, loading section 108, decoding section 112 and display image processing section 114 of the information processing apparatus 10 (S10). If the user looks at the initial image and carries out an operation for moving the viewpoint on the inputting apparatus 20 (Y at S12), then the image switching controlling section 116 refers to a link setting file mapped to the image data of the root node and supervises the display area of the destination of the movement to check whether or not it satisfies some link condition (S14). If no link condition is satisfied, then the decoding section 112 and the display image processing section 114 suitably carry out a decoding process and a rendering process based on frame coordinates calculated by the frame coordinate determination section 110 in response to a viewpoint moving request signal to update the display image so that the display area is moved (N at S14, S22).

On the other hand, if some link condition is satisfied, then the image switching controlling section 116 notifies the loading section 108, decoding section 112 and display image processing section 114 of the satisfaction to switch the display target to an image set as a link destination from among the images of the internal nodes (Y at S14, S16). Then, the area of the link destination in the image after the switching is displayed (S22).

If another viewpoint moving request is issued during display of the image (Y at S12), then a link setting file mapped to the image is referred to and the display image is successively updated while it is supervised to check whether or not a link condition is satisfied (S14, S16, S22). Since an image at an internal node has set therein a link to the image of the root node and a link to an image of a leaf node, the image of the display target is switched suitably between hierarchies depending upon the substance of the viewpoint moving request and the link condition.

If an image of a leaf node is reached in this manner, then the image switching controlling section 116 supervises to check whether or not an operation for returning to an internal node from a leaf node is carried out and whether or not an operation for successively feeding an image between leaf nodes is carried out in addition to the viewpoint moving requesting operation (S17, S18). It is to be noted that, by the time when an image of a leaf node is reached, image data of an internal node used as an entrance and identification information of the link area have been stored into a register as described hereinabove. Then, if a viewpoint moving operation is not carried out but an operation for returning to an internal node is carried out, then the display target is switched to the link area in the image of the internal node serving as the link source, stored in the register at the point of time, to update the display image under the control of the image switching controlling section 116 (Y at S17, S16, S22).

If an operation for successively feeding an image between leaf nodes is carried out, then the display target is switched to the next image in the feeding direction and the display image is updated under the control of the image switching controlling section 116 (N at S12, Y at S18, S20, S22). At this time, the image of the returning destination to the internal node and information of the link area, which are stored in the register described hereinabove, are suitably rewritten depending upon the range of the successive feeding. If none of a viewpoint moving operation, a switching operation from a leaf node to an internal node and a successive feeding operation between leaf nodes is carried out, then a next operation is waited (N at S12, N at S17, N at S18, N at S24).

It is to be noted that, when a switching operation from a leaf node to an internal node is carried out, if the leaf node is a link destination from a plurality of internal nodes as illustrated in FIG. 12, then the flag set when the leaf node has been reached just before is referred to, and the link with regard to which the flag is in a set state is validated. By this, an image of an upper hierarchy node of a type same as that when the leaf node has been reached can be displayed.

Since it is made possible to freely carry out image switching between hierarchies by a viewpoint moving operation and image switching between leaf nodes by a successive feeding operation in this manner, the user can reach desired information efficiently and intuitively. Then, when the user carries out an operation for ending the display on the inputting apparatus 20, the display process is ended (Y at S24).

In the mode described above, one image data is fixedly mapped to each node, and the image of the display target is switched or the display area is moved in response to a viewpoint moving operation or a successive feeding operation. Now, a function for changing an image itself for each node halfway by the image setting controlling section 104 of the control unit 100 is described. This function can be applied to such a mode that a predetermined area of an image is hidden and a portion of the image which is unhidden is gradually increased in response to the degree of progress of a game, a situation of payment of a fee by the user or the like.

Figure 17:
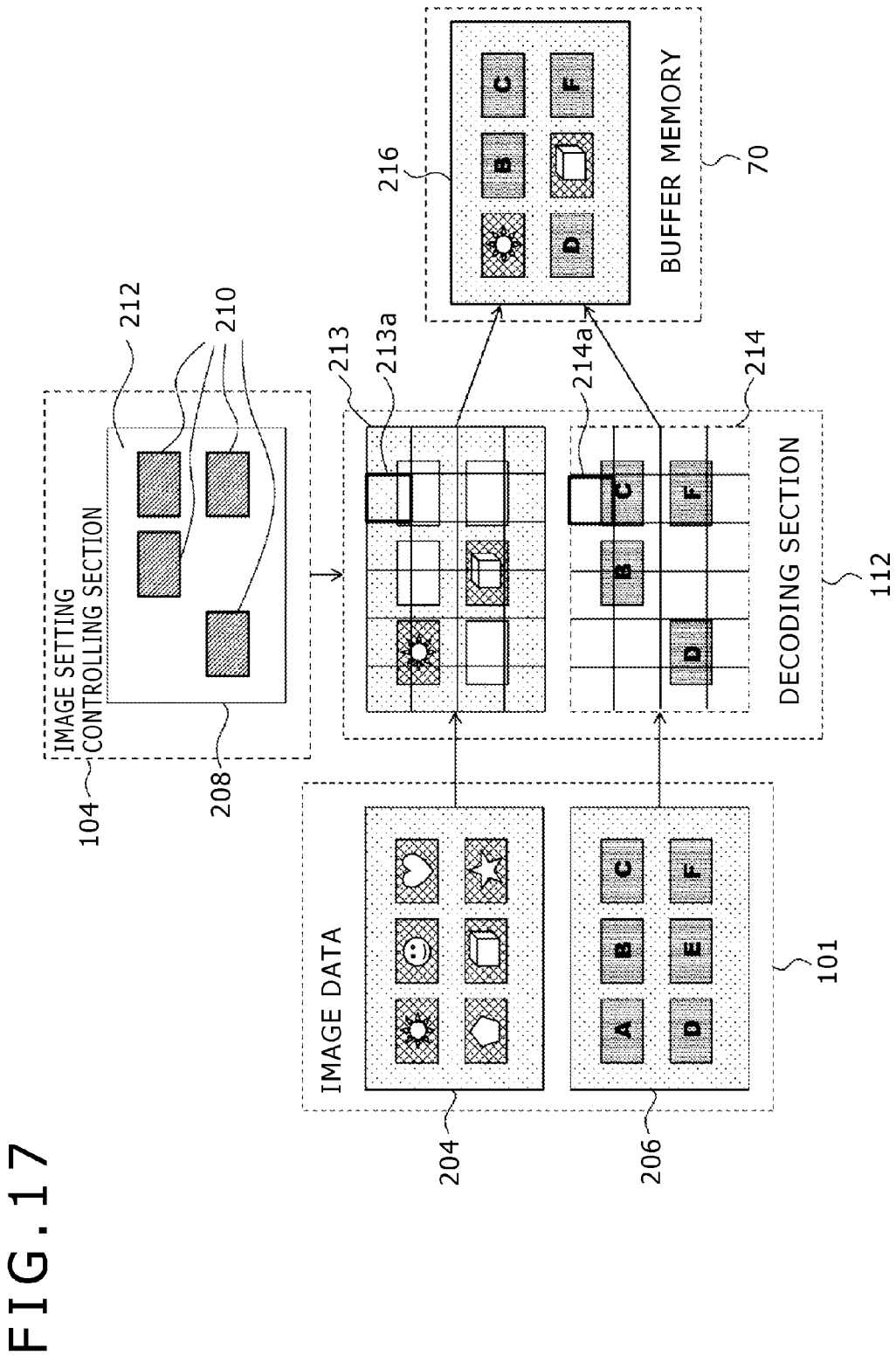
FIG. 17 is a view illustrating the substance of processes of functional blocks in a mode in which an image configuring one node is changed halfway in the present embodiment.

FIG. 17 is a view illustrating the substance of processing of the functional blocks in a mode in which an image which configures one node is changed halfway. First, as image data 101 to be stored into the hard disk drive 50, a plurality of image data are prepared for one node. The image data represent images of the same size having a common coordinate system and may be hierarchical data or data of a single resolution. In the case of FIG. 17, two image data of a first image 204 and a second image 206 are prepared as the image data 101. If this is adapted to the application example described above, then the first image 204 is an image to be displayed finally and the second image 206 is an image for hiding.

The image setting controlling section 104 receives image controlling information acquired by the input information acquisition section 102 from a functional block which executes a game or the like or from a server and decisive of a timing at which the image is to be changed. Based on the received image controlling information, the image setting controlling section 104 determines area dividing information which allocates one of the first image 204 and the second image 206 to each of divisional areas of an image plane in the same coordinate system. In the example of FIG. 17, it is determined that, on an image plane 208, the second image 206 is used for four areas 210 indicated by shading and the first image 204 is used for the other area 212. The determined area dividing information may actually be a frame parameter or the like which represents an area for which the second image 206 is used.

For example, step numbers representative of degrees of progress of a game in steps and area dividing information may be mapped to each other such that, based on a step number acquired as image controlling information, area dividing information corresponding to the step number is acquired. Alternatively, frame parameters of areas to be changed or identification numbers of the areas may be determined in advance such that a direct designation of a frame parameter or an identification number of an area to be disclosed newly is accepted as image controlling information and the area dividing information is updated based on the accepted image controlling information. The image setting controlling section 104 notifies the decoding section 112 of the determined area dividing information.

The decoding section 112 decodes two image data of the first image 204 and the second image 206 loaded in the main memory 60, determines for each pixel based on the area dividing information which one of the image data is to be adopted, and writes the image data to be adopted into the buffer memory 70. In FIG. 17, in images 213 and 214, only portions of the first image 204 and the second image 206 which are to be adopted are represented by the original images while those portions which are not to be adopted are represented by hollow rectangles. The decoding section 112 carries out a decoding process for each of the areas of tile images partitioned in lattice shapes in the images 213 and 214.

Therefore, the decoding section 112 includes two working memories of a size for one tile image. For example, the decoding section 112 decodes a tile image 213a of the first image 204 and a tile image 214a of the second image 206 enclosed by thick lines and stores the decoded tile images into the working memories. At this point of time, data of the entire tile images are stored in both of the working memories. Then, in the example of FIG. 17, data of the tile image 213a in an area of approximately two thirds on the upper side which is not hollow is written into an area of the buffer memory 70 for the corresponding tile image. Further, data of the tile image 214a in an area of approximately one third on the lower side is written into the remaining part of the area for the tile image.

If this process is carried out for the areas of all tile images to be stored into the buffer memory 70, then an image 216 which is the first image 214 including the second image 206 in some areas thereof is stored into the buffer memory 70. When the decoding section 112 carries out a decoding process, it refers at any time to the area dividing information supplied thereto from the image setting controlling section 104 so that a variation of the area dividing information is reflected on an image to be stored into the buffer memory 70. It is to be noted that, while, in FIG. 17, the entire original image is stored in the buffer memory 70, the area to be stored into the buffer memory 70 changes in response to the frame coordinates as described hereinabove.

In this manner, by carrying out decoding for each of tile images by the decoding section 112 and writing a combination of the decoded tile images into the buffer memory 70, even if a plurality of image data are used as a source, a combination process of images can be implemented only by increasing working memories for such tile images. As the size of the tile images decreases, the necessary memory size can be suppressed markedly in comparison with that in an alternative case in which the buffer memory 70 of a large area is prepared by a plural number of times in size.

Where image data are hierarchical data, a similar process is carried out using data of the same hierarchy. The process for loading image data into the main memory 60 and displaying part of data stored in the buffer memory 70 is similar to that described hereinabove with reference to FIG. 7. While, in FIG. 17, two image data are used to produce one image, three or more image data may be used to carry out a similar process. As the number of image data to be used increases, a more complicated variation can be produced.

Further, although the two images of FIG. 17 change rectangular areas disposed discretely, part of such a double-page spread of a book as shown in FIG. 14 may be hidden by assimilating the part with the background such that, for example, the double-page spread is placed from a state in which nothing is written thereon into another state in which characters appear. Also it is possible to use such part of a double-page spread of a book not for the purpose of hiding but for the object only of changing an image.

Further, while, in the foregoing description, an image to be adopted is selected for each pixel and the pixel value is written into the buffer memory 70, the original images may be synthesized by alpha blending. In particular, an alpha channel is provided for each pixel value, and for each area set in the area dividing information, the alpha value of the pixels of an image to be adopted is set to 1 while the alpha value of the pixels of an image not to be adopted is set to 0. Then, if the alpha values thus set are synthesized for each tile image and then developed in the buffer memory 70, then an image similar to that in the above-described mode in which pixel values of one of the images are written can be obtained.

Further, such an alpha blending process as described above may be utilized such that, for each of areas set in the area dividing information, the alpha value of each image is set to a predetermined value equal to or higher than 0 and equal to or lower than 1. This makes it possible to achieve such display that another image appears translucent depending on the area. In this instance, in the area dividing information, information of the alpha value set for each image is included for each area. If a mode in which only the setting of the alpha value is changed without changing the area based on the image controlling information is included, then the variation of the change of the display image can be further increased.

According to the present embodiment described above, information of a tree structure is used as information to be displayed as a content image. Further, a link area is set to an image of each node so that the display can be switched to an image of a different hierarchy in the tree structure by a viewpoint moving operation or an area selection operation. By approximately unifying objects to be represented in a display area before and after switching, switching between different hierarchies can be carried out with continuity. As a result, different kinds of information having different granularities can be followed bidirectionally and continuously from an entire image of the information to detailed information of individual items. Therefore, desired information can be reached intuitively and efficiently. If individual images are retained as hierarchical data represented by a plurality of resolutions, then a more dynamic change of the display image can be implemented and information over a wide range can be encompassed by a synergetic effect with the hierarchies of the tree structure.

Further, by defining an order for images at leaf nodes of the lowest hierarchy, such a switching operation which follows the order as to feed an image forwardly or backwardly is made possible. This makes it possible to achieve transition between leaf nodes without returning to an internal node even if an image of a leaf node is mapped to a different internal node. Further, since the images of the leaf nodes are usually greater in number than the images of the other hierarchies due to the tree structure, it is easier to grasp the position of the display image at present or the order of images in comparison with an alternative case in which such images are arrayed spatially.

As a result, the user can easily switch an access route to an image of a leaf node in regard to whether it is to be set to movement between hierarchies or movement between leaf nodes according to such a type of a content as whether the content is a novel or a picture book or to a situation. By providing the uniformity to images independently of the hierarchy, image switching between hierarchies by a viewpoint moving operation and image switching between leaf nodes by a successive feeding operation can be carried out naturally as a continuous operation. Alternatively, if image switching is carried out in an order set by the same operation method without distinguishing image switching between hierarchies and image switching between leaf nodes by a successive feeding operation from each other, then display switching having continuity can be achieved more easily.

Further, by setting a link so that an image of one leaf node can be reached from images of a plurality of internal nodes or from an image of the root node, the access efficiency to a desired image is improved further. In particular, by providing a plurality of kinds of internal nodes by a classification technique, it becomes possible to multilaterally search images of the leaf nodes. At this time, by unifying a type of an internal node when a leaf node is reached and a type of an internal node upon later returning from the leaf node to the internal node, grasping of the position at present and subsequent search in the information network are facilitated.

When images of leaf nodes corresponding to pages are successively fed in an electronic book or the like, by applying such an image effect that a page represented in an image is turned, a sense of reality that the user is reading through a book can be provided to the user.

Further, by properly using a plurality of images for individual areas, an image which configures one node is produced from a plurality of images. At this time, area dividing information which determines which image data should be used for each area on the image plane is prepared, and the information is varied based on information from the outside to change the display image. This makes it possible to change the display image in various manners depending upon a variation of area division even if the number of original images is small.

At this time, the process of carrying out a decoding process in a unit of a tile image, storing the decoded tile images into the working memory once and then making a choice of and deploying only those decoded tile images which are to be adopted into the buffer memory is repeated. By this, a display image can be produced without increasing the memory size.

The present invention has been described above in connection with the embodiment thereof. The embodiment is an example, and it can be recognized by those skilled in the art that various modifications are possible with regard to the combinations of the components and the processes of the embodiment and also such modifications fall within the scope of the present invention.

REFERENCE SIGNS LIST

1 Information processing system, 10 Information processing apparatus, 12 Display apparatus, 20 Inputting apparatus, 38 Tile image, 44 Display processing unit, 50 Hard disk drive, 60 Main memory, 100 Control unit, 101 Image data, 102 Input information acquisition section, 104 Image setting controlling section, 108 Loading section, 110 Frame coordinate determination section, 112 Decoding section, 114 Display image processing section, 116 Image switching controlling section, 118 Link setting file.

INDUSTRIAL APPLICABILITY

As described above, the present invention can be applied to an information processing apparatus such as a computer, a game apparatus and a content display terminal.

The invention claimed is:

1. An information processing apparatus for changing a display area in response to a viewpoint moving operation of a user to display an image, comprising:
a content storage unit in which data of a plurality of images of a display target and link setting files are stored in a mapped relationship to each other, a link setting file being set for each image in order to implement a link function for switching a display from an image being displayed to a different image when, during display of one image, an inclusion relationship between a display area and a particular link area satisfies a predetermined link condition, the link setting file describing information of the link area and identification information of an image of a link destination,
wherein the link relationship between images is defined by a tree structure comprising node levels, the highest level being a root node, the intermediate levels being one or more internal nodes, and the lowest level being one or more leaf nodes, wherein an image of said root node and an image of an internal node comprise link areas, whereupon when a user moves the display area so that the viewpoint enters one of said link areas, the display target image switches to a different image in accordance with a link in said link area;
an image switching controlling section configured to refer to the link setting files to determine whether or not, in response to the viewpoint moving operation for the image being displayed, the inclusion relationship between the link area set for the image and the display area satisfies the link condition and specify, when the link condition is satisfied, the identification information of the image of the link destination; and
a display image processing section configured to carry out, based on the identification information received from the image switching controlling section, a rendering process for the image data to switch the display image, wherein:
the plural images whose data are stored in the content storage unit include a plurality of images which constitute an image sequence having an order defined in advance, and
the image switching controlling section specifies, when the image being displayed is an image in the image sequence, and in response to a successive feeding operation of the display image carried out by the user, identification information of an image as a switching destination, which is defined as a next image to the image being displayed in the ordered sequence,
wherein switching between images of different node levels occurs when a user moves a display area into the link area of an image, wherein a user switches between leaf node images by way of said successive feeding operation which allows a user to traverse (successively access) images in said leaf nodes in sequential order, wherein a user can return (switch back) from a destination leaf node image to the preceding internal node image by operating an inputting means of an inputting apparatus, wherein the particular image of said preceding internal node returned to (i.e. return destination) is determined from stored information identifying the image and the specific link area from which the last switch occurred, and said stored information is updated to a different link area of the preceding internal node image (i.e. different return destination) when a predetermined number of leaf nodes is traversed by the successive feeding operation.

2. The information processing apparatus according to claim 1, wherein
the plural images whose data are stored in the content storage unit have a tree structure in which a plurality of link areas set for an image of a node of an upper hierarchy are linked to images of nodes of a lower hierarchy different from each other, and the image sequence includes a plurality of images which are on a same hierarchy in the tree structure and are set as link destinations from images of nodes of an upper hierarchy different from each other, and
the image switching controlling section specifies, in response to an operation by the user for switching the display from the hierarchy which configures the image sequence to an image of the upper hierarchy node, identification information of an image of the upper hierarchy node whose link destination is the image before the switching as a switching destination.

3. The information processing apparatus according to claim 2, wherein
the image sequence includes an image set as a link destination from images of a plurality of upper hierarchy nodes which are different in type, and
the image switching controlling section specifies, in response to an operation for switching the display from the hierarchy which configures the image sequence to an image of an upper hierarchy node, identification information of an image of an upper hierarchy node which is of the same type as the type of an image of an upper hierarchy node from which the display was switched last to the image sequence as a switching destination.

4. The information processing apparatus according to claim 2, wherein the image switching controlling section searches, when the display image at a point of time at which an operation for switching the display from the hierarchy which configures the image sequence to an image of the upper hierarchy node is carried out is not an image set as a link destination from the image of the upper hierarchy node, the image sequence in a predetermined direction to detect an image set as a link destination and specifies identification information of an image of an upper hierarchy node for which the detected image is a link destination as a switching destination.

5. The information processing apparatus according to claim 2, wherein the image switching controlling section stores, when the display image is switched to an image included in the image sequence by link setting from an image of an upper hierarchy node, identification information of the image before the switching as a switching destination when an operation for switching the display from the hierarchy which configures the image sequence to an image of an upper hierarchy node is carried out into a register and updates, every time the display image crosses, during display of an image included in the image sequence, a boundary set in advance in the image sequence in response to a successive feeding operation carried out by the user, the identification information of the image of the upper hierarchy node stored in the register.

6. The information processing apparatus according to claim 1, wherein, while the link condition is not satisfied, the display image processing section changes the display area in the image being displayed in response to a viewpoint moving operation for the image being displayed and returns, when the successive feeding operation is carried out, the display area to a predetermined display area, whereafter the display image processing section switches the display to an image defined as a next image in the order.

7. The information processing apparatus according to claim 1, wherein the data of the plural images stored in the content storage unit include hierarchical data which represent one image in different resolutions and are 0 in an order of the resolution.

8. An information processing method for causing an information processing apparatus to change a display area in response to a viewpoint moving operation of a user to display an image, comprising the steps of:

reading out, from a storage apparatus, a content file in which data of a plurality of images of a display target and link setting files are mapped to each other, a link setting file being set for each image in order to implement a link function for switching a display from an image being displayed to a different image when, during display of one image, an inclusion relationship between a display area and a particular link area satisfies a predetermined link condition, the link setting file describing information of the link area and identification information of an image of a link destination, wherein the link relationship between images is defined by a tree structure comprising node levels, the highest level being a root node, the intermediate levels being one or more internal nodes, and the lowest level being one or more leaf nodes, wherein an image of said root node and an image of an internal node comprise link areas, whereupon when a user moves the display area so that the viewpoint enters one of said link areas, the display target image switches to a different image in accordance with a link in said link area;

referring to the link setting files to determine whether or not, in response to the viewpoint moving operation for the image being displayed, the inclusion relationship between the link area set for the image and the display area satisfies the link condition and specifying, when the link condition is satisfied, the identification information of the image of the link destination; and carrying out, based on the identification information, a rendering process for the image data to switch a display image in a display apparatus, wherein the plural images whose data are stored in the storage apparatus include a plurality of images which constitute an image sequence having an order defined in advance;

the step of specifying the identification information specifies, when the image being displayed is an image in the image sequence, and in response to a successive feeding operation of the display image carried out by the user, identification information of an image as a switching destination, which is defined as a next image to the image being displayed in the ordered sequence, wherein switching between images of different node levels occurs when a user moves a display area into the link area of an image, wherein a user switches between leaf node images by way of said successive feeding operation which allows a user to traverse (successively access) images in said leaf nodes in sequential order, wherein a user can return (switch back) from a destination leaf node image to the preceding internal node image by operating an inputting means of an inputting apparatus, wherein the particular image of said preceding internal node returned to (i.e. return destination) is determined from stored information identifying the image and the specific link area from which the last switch occurred, and said stored information is updated to a different link area of the preceding internal node image (i.e. different return destination) when a predetermined number of leaf nodes is traversed by the successive feeding operation.

9. An apparatus comprising a microprocessor operating under the control of a computer program for causing the microprocessor to move a display area in response to a viewpoint moving operation of a user to display an image, the computer program causing the microprocessor and peripherals to carry out the actions of:

reading out, from a storage apparatus, a content file in which data of a plurality of images of a display target and link setting files are mapped to each other, a link setting file being set for each image in order to implement a link function for switching a display from an image being displayed to a different image when, during display of one image, an inclusion relationship between a display area and a particular link area satisfies a predetermined link condition, the link setting file describing information of the link area and identification information of an image of a link destination, wherein the link relationship between images is defined by a tree structure comprising node levels, the highest level being a root node, the intermediate levels being one or more internal nodes, and the lowest level being one or more leaf nodes, wherein an image of said root node and an image of an internal node comprise link areas, whereupon when a user moves the display area so that the viewpoint enters one of said link areas, the display target image switches to a different image in accordance with a link in said link area;

referring to the link setting files to determine whether or not, in response to the viewpoint moving operation for the image being displayed, the inclusion relationship between the link area set for the image and the display area satisfies the link condition and specifying, when the link condition is satisfied, the identification information of the image of the link destination; and carrying out, based on the identification information, a rendering process for the image data to switch a display image in a display apparatus;

the plural images whose data are stored in the storage apparatus include a plurality of images which constitute an image sequence having an order defined in advance;

the function for specifying the identification information specifies, when the image being displayed is an image in the image sequence, and in response to a successive feeding operation of the display image carried out by the user, identification information of an image as a switching destination, which is defined as a next image to the image being displayed in the ordered sequence, wherein switching between images of different node levels occurs when a user moves a display area into the link area of an image, wherein a user switches between leaf node images by way of said successive feeding operation which allows a user to traverse (successively access) images in said leaf nodes in sequential order, wherein a user can return (switch back) from a destination leaf node image to the preceding internal node image by operating an inputting means of an inputting apparatus, wherein the particular image of said preceding internal node returned to (i.e. return destination) is determined from stored information identifying the image and the specific link area from which the last switch occurred, and said stored information is updated to a different link area of the preceding internal node image (i.e. different return destination) when a predetermined number of leaf nodes is traversed by the successive feeding operation.

10. A non-transitory, computer readable recording medium on or in which a computer program for causing a computer to implement a function for moving a display area in response to a viewpoint moving operation of a user to display an image is recorded, the computer program causing the computer to implement the functions for:

reading out, from a storage apparatus, a content file in which data of a plurality of images of a display target and link setting files are mapped to each other, a link setting file being set for each image in order to implement a link function for switching a display from an image being displayed to a different image when, during display of one image, an inclusion relationship between a display area and a particular link area satisfies a predetermined link condition, the link setting file describing information of the link area and identification information of an image of a link destination, wherein the link relationship between images is defined by a tree structure comprising node levels, the highest level being a root node, the intermediate levels being one or more internal nodes, and the lowest level being one or more leaf nodes, wherein an image of said root node and an image of an internal node comprise link areas, whereupon when a user moves the display area so that the viewpoint enters one of said link areas, the display target image switches to a different image in accordance with a link in said link area;

referring to the link setting files to determine whether or not, in response to the viewpoint moving operation for the image being displayed, the inclusion relationship between the link area set for the image and the display area satisfies the link condition and specifying, when the link condition is satisfied, the identification information of the image of the link destination; and carrying out, based on the identification information, a rendering process for the image data to switch a display image in a display apparatus;

the plural images whose data are stored in the storage apparatus include a plurality of images which constitute an image sequence having an order defined in advance;

the function for specifying the identification information specifies, when the image being displayed is an image in the image sequence, and in response to a successive feeding operation of the display image carried out by the user, identification information of an image as a switching destination, which is defined as a next image to the image being displayed in the ordered sequence, wherein switching between images of different node levels occurs when a user moves a display area into the link area of an image, wherein a user switches between leaf node images by way of said successive feeding operation which allows a user to traverse (successively access) images in said leaf nodes in sequential order, wherein a user can return (switch back) from a destination leaf node image to the preceding internal node image by operating an inputting means of an inputting apparatus, wherein the particular image of said preceding internal node returned to (i.e. return destination) is determined from stored information identifying the image and the specific link area from which the last switch occurred, and said stored information is updated to a different link area of the preceding internal node image (i.e. different return destination) when a predetermined number of leaf nodes is traversed by the successive feeding operation.

11. A non-transitory computer readable storage medium containing a data structure of a content file which is processed in an information processing apparatus moving a display area in response to a viewpoint moving operation of a user to display an image, wherein data of a plurality of images of a display target and link setting data are mapped to each other, the link setting data being set for each image in order to implement a link function for switching a display from an image being displayed to a different image when, during display of one image, an inclusion relationship between a display area and a particular link area satisfies a predetermined link condition, the link setting data describing information of the link area and identification information of an image of a link destination, the link setting data being referred to in order to determine whether or not, in response to the viewpoint moving operation for the image being displayed, the inclusion relationship between the link area set for the image and the display area satisfies the link condition and switch the display image to the image of the link destination, wherein the link relationship between images is defined by a tree structure comprising node levels, the highest level being a root node, the intermediate levels being one or more internal nodes, and the lowest level being one or more leaf nodes, wherein an image of said root node and an image of an internal node comprise link areas, whereupon when a user moves the display area so that the viewpoint enters one of said link areas, the display target image switches to a different image in accordance with a link in said link area, and the plural images include a plurality of images which constitute an image sequence having an order defined for switching the display in response to a successive feeding operation of the display image carried out by the user, wherein switching between images of different node levels occurs when a user moves a display area into the link area of an image, wherein a user switches between leaf node images by way of said successive feeding operation which allows a user to traverse (successively access) images in said leaf nodes in sequential order, wherein a user can return (switch back) from a destination leaf node image to the preceding internal node image by operating an inputting means of an inputting apparatus, wherein the particular image of said preceding internal node returned to (i.e. return destination) is determined from stored information identifying the image and the specific link area from which the last switch occurred, and said stored information is updated to a different link area of the preceding internal node image (i.e. different return destination) when a predetermined number of leaf nodes is traversed by the successive feeding operation.

* * * * *